(12) United States Patent
Li et al.

(10) Patent No.: US 11,121,617 B2
(45) Date of Patent: Sep. 14, 2021

(54) DRIVER IC CIRCUIT OF INTELLIGENT POWER MODULE, INTELLIGENT POWER MODULE, AND AIR CONDITIONER

(71) Applicants: GD MIDEA AIR-CONDITIONING EQUIPMENT CO., LTD., Guangdong (CN); MIDEA GROUP CO., LTD., Guangdong (CN)

(72) Inventors: Yesheng Li, Guangdong (CN); Yuxiang Feng, Guangdong (CN)

(73) Assignees: GD MIDEA AIR-CONDITIONING EQUIPMENT CO., LTD., Guangdong (CN); MIDEA GROUP CO., LTD., Guangdong (CN)

( * ) Notice: Subject to any disclaimer, the term of this patent is extended or adjusted under 35 U.S.C. 154(b) by 90 days.

(21) Appl. No.: 16/582,464

(22) Filed: Sep. 25, 2019

(65) Prior Publication Data
US 2020/0036279 A1    Jan. 30, 2020

Related U.S. Application Data

(63) Continuation of application No. PCT/CN2019/084289, filed on Apr. 25, 2019.

(30) Foreign Application Priority Data

Jul. 24, 2018  (CN) .......................... 201810832385.6
Jul. 24, 2018  (CN) .......................... 201810832530.0
(Continued)

(51) Int. Cl.
*H02M 1/08*    (2006.01)
*H02M 1/42*    (2007.01)
(Continued)

(52) U.S. Cl.
CPC .............. *H02M 1/08* (2013.01); *F25B 49/025* (2013.01); *H02M 1/42* (2013.01); *H02P 5/00* (2013.01)

(58) Field of Classification Search
CPC ......... H02M 1/08; H02M 1/42; F25B 49/025; H02P 5/00
(Continued)

(56) References Cited

U.S. PATENT DOCUMENTS

2011/0089913 A1*  4/2011  Li ........................... H02M 7/23
                                                323/208
2012/0155139 A1*  6/2012  Boeke ................... H02M 7/217
                                                363/131

FOREIGN PATENT DOCUMENTS

CN        107453739 A      12/2017
CN        108092521 A      5/2018
(Continued)

OTHER PUBLICATIONS

Notice of Reasons for Refusal dated Oct. 20, 2020 received in Japanese Patent Application No. JP 2019-544911 together with an English language translation.

*Primary Examiner* — Jorge L Carrasquillo
(74) *Attorney, Agent, or Firm* — Scully, Scott, Murphy & Presser, P.C.

(57) ABSTRACT

Disclosed are a driver IC circuit of an intelligent power module, an intelligent power module and an air conditioner. The driver IC circuit includes: an operating voltage input end, an inverter logic buffer circuit, an upper bridge driver circuit, a lower bridge driver circuit, a PFC logic buffer circuit, a PFC driver circuit, a first voltage regulation control input end, a second voltage regulation control input end, a first voltage regulation module and a second voltage regulation module. The first voltage regulation module increases or decreases the operating voltage according to the first
(Continued)

voltage regulation control signal; the second voltage regulation module increase or decreases the operating voltage according to the second voltage regulation control signal; or output the operating voltage to the PFC logic buffer input circuit and the PFC driver circuit. The problem that existing driver IC circuits cannot directly drive SiC-based power switching devices can be solved.

10 Claims, 7 Drawing Sheets

(30) Foreign Application Priority Data

Jul. 24, 2018 (CN) .......................... 201821189193.X
Jul. 24, 2018 (CN) .......................... 201821191216.0

(51) Int. Cl.
*F25B 49/02* (2006.01)
*H02P 5/00* (2016.01)

(58) Field of Classification Search
USPC ......................................................... 318/504
See application file for complete search history.

(56) References Cited

FOREIGN PATENT DOCUMENTS

| CN | 208386448 U | 1/2019 |
| CN | 208479500 U | 2/2019 |

* cited by examiner

DRIVER IC CIRCUIT OF INTELLIGENT POWER MODULE, INTELLIGENT POWER MODULE, AND AIR CONDITIONER

CROSS-REFERENCE TO RELATED APPLICATIONS

The present disclosure claims the priority to PCT/CN2019/084289, filed Apr. 25, 2019, which claims the benefit of Chinese Patent Applications with No. 201810832385.6, No. 201821189193.X, No. 201821191216.0, and No. 201810832530.0, filed July 24, 2018 with the National Intellectual Property Administration and entitled "Driver IC Circuit of Intelligent Power Module, Intelligent Power Module, and Air Conditioner", the entirety of which is hereby incorporated herein by reference for all purposes. No new matter has been introduced.

FIELD

The present disclosure relates to the field of intelligent power module, and more particularly relates to a driver IC circuit of an intelligent power module, an intelligent power module, and an air conditioner.

BACKGROUND

An intelligent power module (IPM) is a power driven product that combines technologies of power electronics and integrated circuit. The intelligent power module integrates power switching devices and high voltage driver circuits, and has built-in error detecting circuits for detecting overvoltage, over-current, and/or over-temperature. The intelligent power module not only receives control signals from a microcontroller unit (MCU) to drive other circuits, but also sends state detecting signals of the system back to the MCU. Due to high-integration and high-reliability of the intelligent power module, it has earned an increasing portion of the market share, especially being widely applied in variable-frequency drivers and inverter power supplies for driving motors. It is seen as an ideal power electronic device for frequency converters, metallurgical machineries, electric traction, servo drives, and frequency conversion electrical appliances.

The intelligent power module has been widely used in air conditioners. A inverter air conditioner typically includes a fan, a compressor, and a PFC module, which three are driven by three separate intelligent power modules. In the conventional inverter air conditioner, driver circuits of the fan and of the compressor are integrated by simply superposing on each other, which does not achieve true high-integration and miniaturization. Thus, how to further optimize the IPM integration in the air conditioner is a problem to be solved.

In addition, current power switching devices in the intelligent power module are Si-based, which has already been intensively researched. As the performance of a Si-based power switching device is approaching its limit, it is unlikely to further improve the overall performance of the IPM by improving structures and/or manufacturing process of the Si-based power switching device. The third-generation semiconductor represented by SiC-based power switching devices (i.e., wide bandgap semiconductor power devices) has high breakdown voltage, high power density, high output power, high operation frequency, and high tolerance to temperature. For example, the SiC-based metal oxide semiconductor field effect transistor (MOSFET) has a high blocking voltage without a tail current as occurred in the Si-based insulated gate bipolar transistor (IGBT), thereby resulting in a low dynamic loss. Further, the diode of the SiC material has a very low switching loss. The Sic material has three times the thermal conductivity as that of the Si material, so that the Sic-based intelligent power module has a better operation temperature and higher reliability. Thus, the SiC-based power switching device (such as, the SiC-based MOSFET) is considered as a perfect replacement for the Si-based IGBT in high-voltage power market.

The Si-based power switching device (such as, the Si-based MOSFET and the Si-based IGBT) generally works at 12V to 15 V. Accordingly, the driving voltage VDD of the IPM in an inverter household appliance (such as, the inverter air conditioner) is usually set to be 15V, that is, a gate driving signal (a high level) of the Si-based power switching device in the intelligent power module is 15V. However, the SiC-based power switching device (such as, the SiC-based MOSFET) generally works at 18V to 20V. Thus, the driver IC circuit of the Si-based power switching device in the intelligent power module (also referred to as the driver IC circuit of the intelligent power module) is not suitable for directly driving the SiC-based power switching device. In most cases, the intelligent power module has both the SiC-based power switching device and the Si-based power switching device. For example, the PFC switch transistor in the intelligent power module generally uses the SiC-based power switching device instead of the Si-based power switching device, in order to increase the power correction factor and improve power efficiency; while the inverter device in the intelligent power module (i.e., an upper bridge-arm switch transistor and a lower bridge-arm switch transistor) still uses the Si-based power switching device. However, the performance of the SiC-based power switching device cannot be maximized when being driven by the driving voltage of the Si-based power switching device.

SUMMARY

The present disclosure provides a driver IC circuit of an intelligent power module, aiming to solve the problem that the existing driver IC circuit of the intelligent power module cannot directly drive the SiC-based power switching devices.

In one aspect, the present disclosure provides a driver IC circuit of an intelligent power module. The driver IC circuit includes an operating voltage input end, an inverter logic buffer circuit, an upper bridge driver circuit, a lower bridge driver circuit, a power factor correction (PFC) logic buffer circuit, a PFC driver circuit, a first voltage regulation control input end, a second voltage regulation control input end, a first voltage regulation module and a second voltage regulation module;

the first voltage regulation control input end is configured to input a first voltage regulation control signal;

the first voltage regulation module is configured to regulate a voltage input by the operating voltage input end according to the first voltage regulation control signal and to supply a first driving voltage to the inverter logic buffer circuit, the upper bridge driver circuit and the lower bridge driver circuit, wherein the voltage input is regulated to increase, decrease or maintain the same to generate the first driving voltage;

the second voltage regulation control input end is configured to input a second voltage regulation control signal;

the second voltage regulation module is configured to regulate the voltage input by the operating voltage input end according to the second voltage regulation control signal, to supply a second driving voltage to the PFC logic buffer circuit and the PFC driver circuit, wherein the voltage input is regulated to increase, decrease or maintain the same to generate the second driving voltage.

In some embodiments, an input end of the first voltage regulation module is connected to the operating voltage input end, a control end of the first voltage regulation module is connected to the first voltage regulation control input end, and an output end of the first voltage regulation module is respectively connected to driving voltage input ends of the inverter logic buffer circuit, the upper bridge driver circuit and the lower bridge driver circuit; an input end of the second voltage regulation module is connected to the operating voltage input end, a control end of the second voltage regulation module is connected to the second voltage regulation control input end, and an output end of the second voltage regulation module is respectively connected to driving voltage input ends of the PFC logic buffer circuit and the PFC driver circuit; an output end of the inverter logic buffer circuit is respectively connected to an input end of the upper bridge driver circuit and an input end of the lower bridge driver circuit; and an output end of the PFC logic buffer circuit is connected to an input end of the PFC driver circuit.

In some embodiments, the first voltage regulation module includes a first step-up module, a first step-down module, and a first analog switch; an input end of the first step-up module and an input end of the first step-down module being connected to the operating voltage input end, an output end of the first step-up module being connected to a first input end of the first analog switch, an output end of the first step-down module being connected to a second input end of the first analog switch, a third input end of the first analog switch being directly connected to the operating voltage input end, a common end of the first analog switch being respectively connected to the driving voltage input ends of the inverter logic buffer circuit, the upper bridge driver circuit and the lower bridge driver circuit, and a control end of the first analog switch being connected to the first voltage regulation control input end.

In some embodiments, the second voltage regulation module includes a second step-up module, a second step-down module, and a second analog switch; an input end of the second step-up module and an input end of the second step-down module being connected to the operating voltage input end, an output end of the second step-up module being connected to a first input end of the second analog switch, an output end of the second step-down module being connected to a second input end of the second analog switch, a third input end of the second analog switch being directly connected to the operating voltage input end, a common end of the second analog switch being respectively connected to the driving voltage input ends of the PFC logic buffer circuit and the PFC driver circuit, and a control end of the second analog switch being connected to the second voltage regulation control input end.

In another aspect, the present disclosure provides a driver IC circuit of an intelligent power module. The driver IC circuit includes an operating voltage input end, an inverter logic buffer circuit, an upper bridge driver circuit, a lower bridge driver circuit, a PFC logic buffer circuit, a PFC driver circuit, a voltage regulation control input end, and a voltage regulation module;

the voltage regulation control input end is configured to input a voltage regulation control signal;

the voltage regulation module is configured to regulate a voltage input by the operating voltage input end according to the voltage regulation control signal input by the voltage regulation control input end, to supply a driving voltage to the inverter logic buffer circuit, the upper bridge driver circuit, the lower bridge driver circuit, the PFC logic buffer circuit and the PFC driver circuit; or directly output the voltage input by the operating voltage input end to driving voltage input ends of the inverter logic buffer circuit, the upper bridge driver circuit, the lower bridge driver circuit, the PFC logic buffer circuit and the PFC driver circuit.

In some embodiments, an input end of the voltage regulation module is connected to the operating voltage input end, a control end of the voltage regulation module is connected to the voltage regulation control input end, and an output end of the voltage regulation module is respectively connected to the driving voltage input ends of the inverter logic buffer circuit, the upper bridge driver circuit, the lower bridge driver circuit, the PFC logic buffer circuit and the PFC driver circuit; an output end of the inverter logic buffer circuit is respectively connected to an input end of the upper bridge driver circuit and an input end of the lower bridge driver circuit; and an output end of PFC logic buffer circuit is connected to an input end of the PFC driver circuit.

In some embodiments, the voltage regulation module includes a step-down module and an analog switch, an input end of the step-down module being connected to the operating voltage input end, an output end of the step-down module being connected to a first input end of the analog switch, a second input end of the analog switch being directly connected to the operating voltage input end, a common end of the analog switch being respectively connected to the driving voltage input ends of the inverter logic buffer circuit, the upper bridge driver circuit, the lower bridge driver circuit, the PFC logic buffer circuit, and the PFC driver circuit, and a control end of the analog switch being connected to the voltage regulation control input end.

In some embodiments, the voltage regulation module includes a step-up module and an analog switch, an input end of the step-up module being connected to the operating voltage input end, an output end of the step-up module being connected to a first input end of the analog switch, a second input end of the analog switch being directly connected to the operating voltage input end, a common end of the analog switch is respectively connected to the driving voltage input ends of the inverter logic buffer circuit, the upper bridge driver circuit, the lower bridge driver circuit, the PFC logic buffer circuit, and the PFC driver circuit, and a control end of the analog switch being connected to the voltage regulation control input end.

In still another aspect, the present disclosure provides an intelligent power module. The intelligent power module includes a power input end of a low voltage region, a first voltage regulation end, a second voltage regulation end, an upper bridge-arm control input end, a lower bridge-arm control input end, and a PFC control input end, a plurality of resistors, a first upper bridge-arm switch transistor, a second upper bridge-arm switch transistor, a third upper bridge-arm switch transistor, a first lower bridge-arm switch transistor, a second lower bridge-arm switch transistor, a third lower bridge-arm switch transistor, a PFC switch transistor, and the driver IC circuit as described above;

the power input end of the low voltage region is connected to the operating voltage input end of the driver IC circuit; the first voltage regulation end is connected to the first voltage regulation control input end of the driver IC circuit, the second voltage regulation end is connected to the second voltage regulation control input end of the driver IC circuit; the upper bridge-arm control input end is connected to the upper bridge control input end of the driver IC circuit, the lower bridge-arm control input end is connected to the lower bridge control input end of the driver IC circuit; the PFC control input end is connected to a PFC control input end of the driver IC circuit; a first output end of the upper bridge driver circuit is connected to a control end of the first upper bridge-arm switch transistor via one of the resistors, a second output end of the upper bridge driver circuit is connected to a control end of the second upper bridge-arm switch transistor via one of the resistors, and a third output end of the upper bridge driver circuit is connected to a control end of the third upper bridge-arm switch transistor via one of the resistors; a first output end of the lower bridge driver circuit is connected to a control end of the first lower bridge-arm switch transistor via one of the resistors, a second output end of the lower bridge driver circuit is connected to a control end of the second lower bridge-arm switch transistor via one of the resistors, and a third output end of the lower bridge driver circuit is connected to a control end of the third lower bridge-arm switch transistor via one of the resistors; an output end of the PFC driver circuit is connected to a control end of the PFC switch transistor via one of the resistors.

For example, the first upper bridge-arm switch transistor, the second upper bridge-arm switch transistor, the third upper bridge-arm switch transistor, the first lower bridge-arm switch transistor, the second lower bridge-arm switch transistor, the third lower bridge-arm switch transistor, and the PFC switch transistor are Si-based insulated gate bipolar transistors or SiC-based metal-oxide-semiconductor field effect transistors.

In still another aspect, the present disclosure provides an intelligent power module. The intelligent power module includes a power input end of a low voltage region, a first voltage regulation end, a second voltage regulation end, an upper bridge-arm control input end, a lower bridge-arm control input end, and a PFC control input end, a plurality of resistors, a first upper bridge-arm switch transistor, a second upper bridge-arm switch transistor, a third upper bridge-arm switch transistor, a first lower bridge-arm switch transistor, a second lower bridge-arm switch transistor, a third lower bridge-arm switch transistor, a PFC switch transistor, and the driver IC circuit as described above;

the power input end of the low voltage region is connected to the operating voltage input end of the driver IC circuit; the first voltage regulation end is connected to the first voltage regulation control input end of the driver IC circuit, the second voltage regulation end is connected to the second voltage regulation control input end of the driver IC circuit; the upper bridge-arm control input end is connected to the upper bridge control input end of the driver IC circuit, the lower bridge-arm control input end is connected to the lower bridge control input end of the driver IC circuit; the PFC control input end is connected to a PFC control input end of the driver IC circuit; a first output end of the upper bridge driver circuit is connected to a control end of the first upper bridge-arm switch transistor via one of the resistors, a second output end of the upper bridge driver circuit is connected to a control end of the second upper bridge-arm switch transistor via one of the resistors, and a third output end of the upper bridge driver circuit is connected to a control end of the third upper bridge-arm switch transistor via one of the resistors; a first output end of the lower bridge driver circuit is connected to a control end of the first lower bridge-arm switch transistor via one of the resistors, a second output end of the lower bridge driver circuit is connected to a control end of the second lower bridge-arm switch transistor via one of the resistors, and a third output end of the lower bridge driver circuit is connected to a control end of the third lower bridge-arm switch transistor via one of the resistors; an output end of the PFC driver circuit is connected to a control end of the PFC switch transistor via one of the resistors;

For example, the first upper bridge-arm switch transistor, the second upper bridge-arm switch transistor, the third upper bridge-arm switch transistor, the first lower bridge-arm switch transistor, the second lower bridge-arm switch transistor, the third lower bridge-arm switch transistor, and the PFC switch transistor are Si-based insulated gate bipolar transistors or SiC-based metal-oxide-semiconductor field effect transistors.

In still another aspect, the present disclosure provides an air conditioner. The air conditioner includes any of the intelligent power modules as described above.

In accordance with the present disclosure, by additionally arranging the first voltage regulation control input end, the second voltage regulation control input end, the first voltage regulation module, the second voltage regulation module in the driver IC circuit of the intelligent power module, the first voltage regulation control input end and the second voltage regulation control input end can be controlled to input corresponding voltage regulation signals according to the types of the upper bridge-arm switch transistor, the lower bridge-arm switch transistor, and the PFC switch transistor, and the magnitude of the operating voltage, so that the driver IC circuit can supply suitable driving voltages to the SiC-based power switching devices and the Si-based power switching devices, thereby to solve the problem that the existing driver IC circuit of the intelligent power module cannot directly drive the SiC-based power switching devices.

BRIEF DESCRIPTION OF THE DRAWINGS

In order to illustrate the technical solution in the embodiments of the present disclosure or the prior art more clearly, brief description would be made below to the drawings required in the embodiments of the present disclosure or the prior art. Obviously, the drawings in the following description are merely some of the embodiments of the present disclosure, and those skilled in the art could obtain other drawings according to the structures shown in the drawings without any creative efforts.

DETAILED DESCRIPTION OF THE EMBODIMENTS

It will be appreciated that the specific embodiments described herein are merely illustrative of the present disclosure and are not intended to limit the present disclosure.

The present disclosure provides a driver IC circuit 100 of an intelligent power module, aiming to solve the problem that a driver IC of an existing intelligent power module cannot directly drive a SiC-based power switching device.

Figure 1:
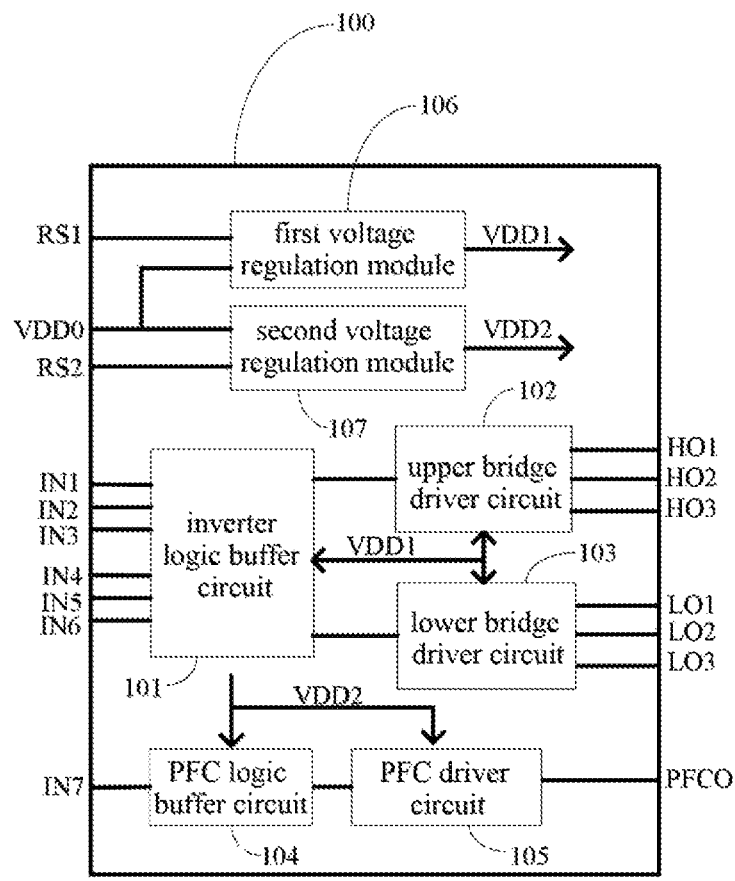
FIG. 1 is a structure diagram illustrating a driver IC circuit of an intelligent power module according to a first embodiment of the present disclosure.

FIG. 1 is a structure diagram illustrating a driver IC circuit of an intelligent power module according to a first embodiment of the present disclosure. Referring to FIG. 1, in this embodiment, a driver IC circuit 100 of an intelligent power module includes an operating voltage input end VDD0, an inverter logic buffer circuit 101, an upper bridge driver circuit 102, a lower bridge driver circuit 103, a PFC logic buffer circuit 104, a PFC driver circuit 105, a first voltage regulation control input end RS1, a second voltage regulation control input end RS2, a first voltage regulation module 106, and a second voltage regulation module 107.

The first voltage regulation control input end RS1 is configured to input a first voltage regulation control signal.

The first voltage regulation module 106 is configured to increase (for example, step up) or decrease (for example, step down) a voltage input by the operating voltage input end VDD0, according to the first voltage regulation control signal input by the first voltage regulation control input end RS1, so as to supply driving voltages to the inverter logic buffer circuit 101, the upper bridge driver circuit 102 and the lower bridge driver circuit 103. Additionally or alternatively, the first voltage regulation module 106 is configured to directly output the voltage input by the operating voltage input end VDD0 to driving voltage input ends of the inverter logic buffer circuit 101, the upper bridge driver circuit 102 and the lower bridge driver circuit 103, respectively; and in this case, the driving voltages of the inverter logic buffer circuit 101, the upper bridge driver circuit 102 and the lower bridge driver circuit 103 are equal to the voltage input by the operating voltage input end VDD0.

The second voltage regulation control input end RS2 is configured to input a second voltage regulation control signal.

The second voltage regulation module 107 is configured to increase (for example, step up) or decrease (for example, step down) the voltage input by the operating voltage input end VDD0, according to the second voltage regulation control signal input by the second voltage regulation control input end RS2, so as to supply driving voltages to the PFC logic buffer circuit 104 and the PFC driver circuit 105. Additionally or alternatively, the second voltage regulation module 107 is configured to directly output the voltage input by the operating voltage input end VDD0 to driving voltage input ends of the PFC logic buffer circuit 104 and the PFC driver circuit 105; and in this embodiment, the driving voltages of the PFC logic buffer circuit 104 and the PFC driver circuit 105 are equal to the voltage input by the operating voltage input end VDD0.

In this embodiment, an input end of the first voltage regulation module 106 is connected to the operating voltage input end VDD0, a control end of the first voltage regulation module 106 is connected to the first voltage regulation control input end RS1, and an output end of the first voltage regulation module 106 is respectively connected to the driving voltage input ends of the inverter logic buffer circuit 101, the upper bridge driver circuit 102 and the lower bridge driver circuit 103. An input end of the second voltage regulation module 107 is connected to the operating voltage input end VDD0, a control end of the second voltage regulation module 107 is connected to the second voltage regulation control input end RS2, and an output end of the second voltage regulation module 107 is respectively connected to the driving voltage input ends of the PFC logic buffer circuit 104 and the PFC driver circuit 105. An output end of the inverter logic buffer circuit 101 is respectively connected to the input end of the upper bridge driver circuit 102 and the input end of the lower bridge driver circuit 103. An output end of the PFC logic buffer circuit 104 is connected to the input end of the PFC driver circuit 105. In this embodiment as shown in FIG. 1, IN1, IN2 and IN3 are upper bridge control input ends of the driver IC circuit 100; IN4, IN5 and IN6 are lower bridge control input ends of the driver IC circuit 100; and IN7 is a PFC input end of the driver IC circuit 100. IN1, IN2, IN3, IN4, IN5 and IN6 are connected to the inverter logic buffer circuit 101, and IN7 is connected to the PFC logic buffer circuit. HO1 is a first output end of the upper bridge driver circuit 102, HO2 is a second output end of the upper bridge driver circuit 102, and HO3 is a third output end of the upper bridge driver circuit 102. LO1 is a first output end of the lower bridge driver circuit 103, LO2 is a second output end of the lower bridge driver circuit 103, and LO3 is a third output end of the lower bridge driver circuit 103. PFCO is an output end of the PFC driver circuit 105. The first output end HO1, the second output end HO2, and the third output end HO3 of the upper bridge driver circuit 102 are respectively connected to control ends of corresponding upper bridge-arm switch transistors (not shown) in the intelligent power module. The first output end LO1, the second output end LO2, and the third output end LO3 of the lower bridge driver circuit 103 are respectively connected to control ends of corresponding lower bridge-arm switch transistors (not shown) in the intelligent power module. The output end PFCO of the PFC driver circuit 105 is connected to a control end of a PFC switch transistor (not shown) in the intelligent power module.

Figure 2:
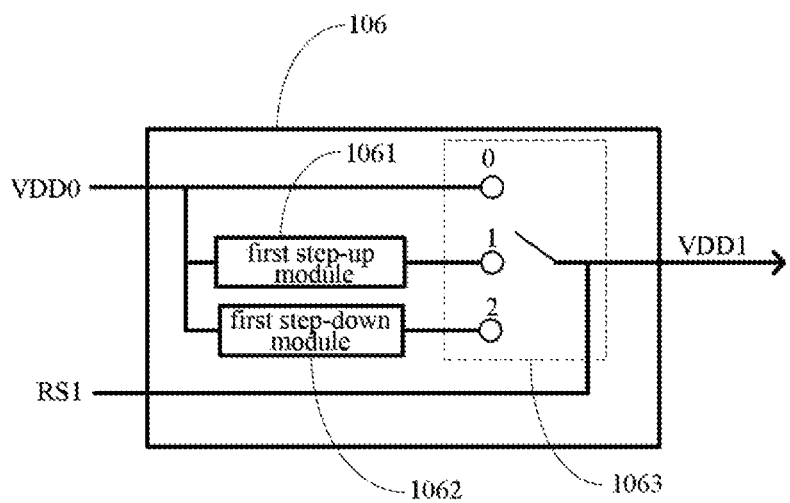
FIG. 2 is a structure diagram illustrating a first voltage regulation module in the driver IC circuit of the intelligent power module according to the first embodiment.

FIG. 2 is a structure diagram illustrating a first voltage regulation module in the driver IC circuit of the intelligent power module according to the first embodiment. Referring to FIGS. 1 and 2, in this embodiment, the first voltage regulation module 106 includes a first step-up module 1061, a first step-down module 1062, and a first analog switch 1063. An input end of the first step-up module 1061 and an input end of the first step-down module 1062 are connected to the operating voltage input end VDD0; an output end of the first step-up module 1061 is connected to a first input end (corresponding to the end 1 shown in FIG. 2) of the first analog switch 1063; an output end of the first step-down module 1062 is connected to a second input end (corresponding to the end 2 shown in FIG. 2) of the first analog switch 1063; a third input end (corresponding to the end 0 shown in FIG. 2) of the first analog switch 1063 is directly connected to the operating voltage input end VDD0; a common end of the first analog switch 1063 is respectively connected to the driving voltage input ends of the inverter logic buffer circuit 101, the upper bridge driver circuit 102 and the lower bridge driver circuit 103; and a control end of the first analog switch 1063 is connected to the first voltage regulation control input end RS1.

Figure 3:
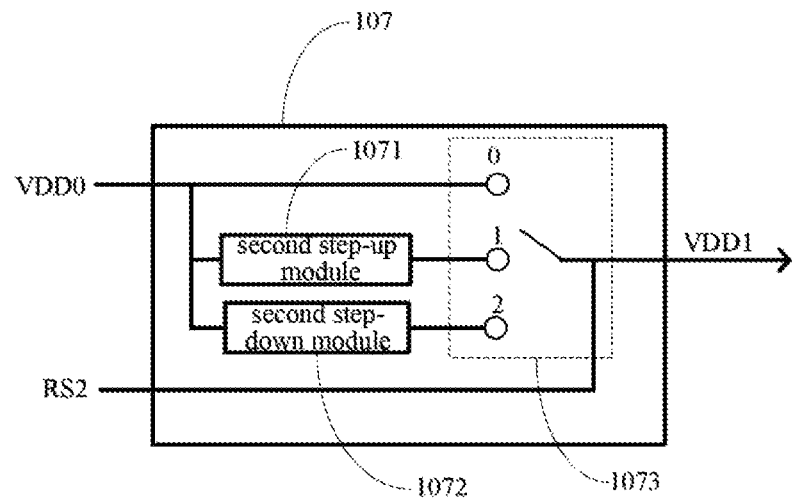
FIG. 3 is a structure diagram illustrating a second voltage regulation module in the driver IC circuit of the intelligent power module according to the first embodiment.

FIG. 3 is a structure diagram illustrating a second voltage regulation module in the driver IC circuit of the intelligent power module according to the first embodiment. Referring to FIGS. 1 and 3, in the embodiment, the second voltage regulation module 107 includes a second step-up module 1071, a second step-down module 1072, and a second analog switch 1073. An input end of the second step-up module 1071 and an input end of the second step-down module 1072 are connected to the operating voltage input end VDD0; an output end of the second step-up module 1071 is connected to a first input end (corresponding to the end 1 shown in FIG. 3) of the second analog switch 1073; an output end of the second step-down module 1072 is connected to a second input end (corresponding to the end 2 shown in FIG. 3) of the second analog switch 1073; a third input end (corresponding to the end 0 shown in FIG. 3) of the second analog switch 1073 is directly connected to the operating voltage input end VDD0; a common end of the second analog switch 1073 is respectively connected to the driving voltage input ends of the PFC logic buffer circuit 104 and the PFC driver circuit 105; and a control end of the second analog switch 1073 is connected to the second voltage regulation control input end RS2. In this embodiment, the voltage of the operating voltage input end is 15V or 20V.

As the first voltage regulation module 106 and the second voltage regulation module 107 are arranged in the driver IC circuit 100 of the intelligent power module, users can input different voltage regulation signals at the first voltage regulation control input RS1 and the second voltage regulation control end RS2 respectively, according to different power switching devices (such as, Si-based power switching devices or SiC-based power switching devices) in the intelligent power module. In this way, the first voltage regulation module 106 and the second voltage regulation module 107 can regulate (increase or decrease; for example, both the increasing and the decreasing can be in a step manner) the voltage input by the operating voltage input end VDD0, to obtain driving voltages suitable for the power switching devices. Specifically, in this embodiment, the first voltage regulation module 106 is configured to regulate the voltage input by the operating voltage input end VDD0 to a first driving voltage VDD1, and output the first driving voltage VDD1 to the driving voltage input ends of the inverter logic buffer circuit 101, the upper bridge driver circuit 102 and the lower bridge driver circuit 103; the second voltage regulation module 107 is configured to regulate the voltage input by the operating voltage input end VDD0 to a second driving voltage VDD2, and output the second driving voltage VDD2 to the driving voltage input ends of the PFC logic buffer circuit 104 and the PFC driver circuit 105. In this embodiment, either one of the first voltage regulation module 106 and the second voltage regulation module 107 can increase the voltage or decrease the voltage.

In this embodiment, on condition that the voltage of the operating voltage input end VDD0 is 15V, that the upper bridge-arm switch transistor and the lower bridge-arm switch transistor in the intelligent power module are the Si-based power switching devices (such as, the Si-based IGBTs), and that the PFC switch transistor in the intelligent power module is the SiC-based power switch device (such as, the SiC-based MOSFET), the first voltage regulation control signal of the first voltage regulation input end RS1 can be controlled to switch the first analog switch 1063 to the end labeled 0, that is, the first voltage regulation module 106 directly outputs the driving voltage of 15V to the driving voltage input ends of the inverter logic buffer circuit 101, the upper bridge driver circuit 102, and the lower bridge driver circuit 103, so as to supply the driving voltage of 15V to the upper bridge-arm switch transistor (the Si-based power switching device) connected to the output end of the upper bridge driver circuit 102 and the lower bridge-arm switch transistor (the Si-based power switching device) connected to the output end of the lower bridge driver circuit 103. And the second voltage regulation control signal of the second voltage regulation input end RS2 can be controlled to switch the second analog switch 1073 to the end labeled 1, so that the second step-up module 1071 in the second voltage regulation module 107 increases or steps up the input voltage of 15V, so as to output a voltage of 20V that is suitable for the PFC switch transistor (the SiC-based power switching device).

In this embodiment, on condition that the voltage of the operating voltage input end VDD0 is 15V and that the upper bridge-arm switch transistor, the lower bridge-arm switch transistor and the PFC switch transistor in the intelligent power module are the Si-based power switching devices, the first voltage regulation control signal of the first voltage regulation input end RS1 can be controlled to switch the first analog switch 1063 to the end labeled 0, and the second voltage regulation control signal of the second voltage regulation input end RS2 can be controlled to switch the second analog switch 1073 to the end labeled 0. As such, the first voltage regulation module 106 and the second voltage regulation module 107 both output the driving voltages of 15V for the upper bridge-arm switch transistor, the lower bridge-arm switch transistor, and the PFC switch transistor.

In this embodiment, on condition that the voltage of the operating voltage input end VDD0 is 15V and that the upper bridge-arm switch transistor, the lower bridge-arm switch transistor and the PFC switch transistor in the intelligent power module are the SiC-based power switching devices, the first voltage regulation control signal of the first voltage regulation input end RS1 can be controlled to switch the first analog switch 1063 to the end labeled 1, and the second voltage regulation control signal of the second voltage regulation input end RS2 can be controlled to switch the second analog switch 1073 to the end labeled 1. As such, the first voltage regulation module 106 and the second voltage regulation module 107 both increase the voltage of 15V input by the operating voltage input end, so as to output the driving voltages of 20V that are suitable for the SiC-based power switching devices.

In this embodiment, on condition that the voltage of the operating voltage input end VDD0 is 20V and that the upper bridge-arm switch transistor and the lower bridge-arm switch transistor in the intelligent power module are the Si-based power switching devices (such as, the Si-based IGBTs) and the PFC switch transistor in the intelligent power module is the SiC-based power switch device (such as, the SiC-based MOSFET), the first voltage regulation control signal of the first voltage regulation input end RS1 can be controlled to switch the first analog switch 1063 to the end labeled 2, so that the first voltage regulation module 106 decreases or steps down the voltage of 20V, so as to output the driving voltages of 15V that are suitable for the upper bridge-arm switch transistor and the lower bridge-arm switch transistor (the Si-based power switching devices). And the second voltage regulation control signal of the second voltage regulation input end RS2 can be controlled to switch the second analog switch 1073 to the end labeled 0, so that the second voltage regulation module 107 directly outputs the driving voltage of 20V to the driving voltage input ends of the PFC logic buffer circuit 104 and the PFC driver circuit 105, thereby to supply the driving voltage of 20V to the PFC switch transistor (the Sic-based switching device) connected to the output end of the PFC driver circuit 105.

In this embodiment, on condition that the voltage of the operating voltage input end VDD0 is 20V and that the upper bridge-arm switch transistor, the lower bridge-arm switch transistor and the PFC switch transistor are the Si-based power switching devices, the first voltage regulation control signal of the first voltage regulation input end RS1 can be controlled to switch the first analog switch 1063 to the end labeled 2, and the second voltage regulation control signal of the second voltage regulation input end RS2 can be controlled to switch the second analog switch 1073 to the end labeled 2. As such, the first voltage regulation module 106 and the second voltage regulation module 107 both decrease or step down the voltage of 20V, so as to output the driving voltages of 15V that are suitable for the Si-based power switching devices.

In this embodiment, on condition that the voltage of the operating voltage input end VDD0 is 20V and that the upper bridge-arm switch transistor, the lower bridge-arm switch transistor and the PFC switch transistor are the SiC-based power switching devices, the first voltage regulation control signal of the first voltage regulation input end RS1 can be controlled to switch the first analog switch 1063 to the end labeled 0, and the second voltage regulation control signal of the second voltage regulation input end RS2 can be controlled to switch the second analog switch 1073 to the end labeled 0. As such, the first voltage regulation module 106 and the second voltage regulation module 107 both directly output the voltages of 20 V that are suitable for the SiC-based power switching devices.

As described above, in the driver IC circuit 100 of the intelligent power module according to this embodiment, both the first voltage regulation module 106 and the second voltage regulation module 107 can increase and/or decrease the input voltage, thus can be used to regulate the voltage regulation control signals of the first voltage regulation control input end RS1 and the second voltage regulation control input end RS2, to realize switching between different driving voltages, thereby to solve the problem that the driver IC in the existing intelligent power module cannot directly drive the SiC-based power switching device. Thus, the driver IC circuit 100 of the intelligent power module in this embodiment is applied for traditional Si-based power switching devices, such as the Si-based IGBT, and also for SiC-based power switching devices, such as the SiC-based MOSFET, thus, suitable for the device in which all the switch transistors use the traditional Si-based power switching devices or use the SiC-based power switching devices. The driver IC circuit 100 of the intelligent power module in this embodiment has a large flexibility, and the difficulty of the electronic control design is also reduced, which is beneficial to the performance of the SiC-based power switching device.

Figure 4:
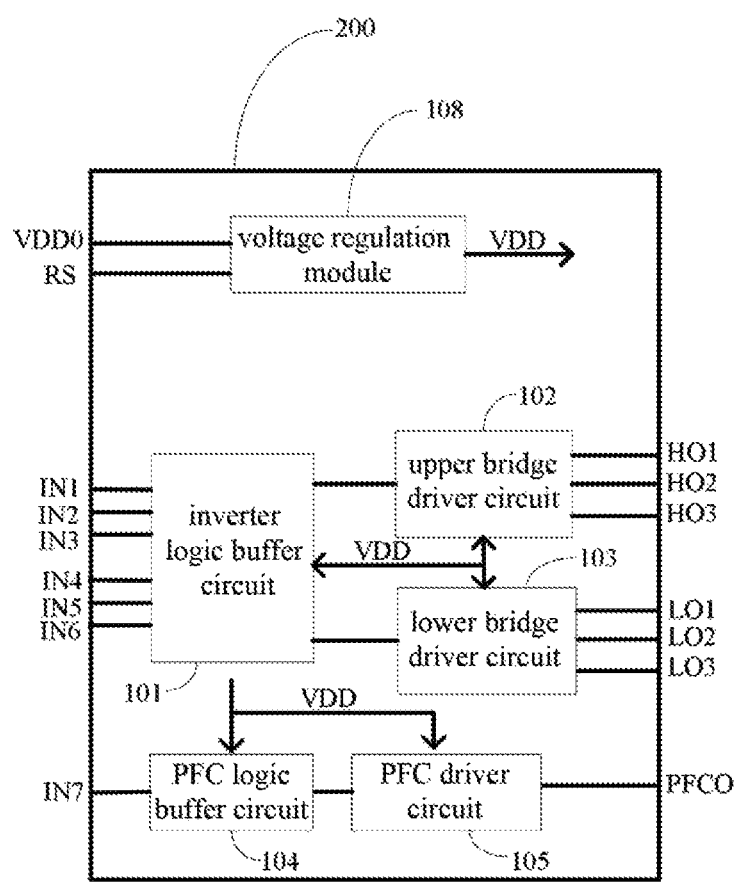
FIG. 4 is a structure diagram illustrating a driver IC circuit of an intelligent power module according to a second embodiment of the present disclosure.

FIG. 4 is a structure diagram illustrating a driver IC circuit of an intelligent power module according to a second embodiment of the present disclosure. Referring to FIG. 4, in the embodiment, the driver IC circuit 200 of the intelligent power module includes an operating voltage input end VDD0, an inverter logic buffer circuit 101, an upper bridge driver circuit 102, a lower bridge driver circuit 103, a PFC logic buffer circuit 104, a PFC driver circuit 105, a voltage regulation control input end RS, and a voltage regulation module 108.

In this embodiment, the voltage regulation control input end RS is configured to input a voltage regulation control signal.

The voltage regulation module 108 is configured to regulate a voltage input by the operating voltage input end VDD0 according to the voltage regulation control signal input by the voltage regulation control input end RS, to supply driving voltages to the inverter logic buffer circuit 101, the upper bridge driver circuit 102, the lower bridge driver circuit 103, the PFC logic buffer circuit 104 and the PFC driver circuit 105. Additionally or alternatively, the voltage regulation module 108 is configured to directly output the voltage input by the operating voltage input end VDD0 to driving voltage input ends of the inverter logic buffer circuit 101, the upper bridge driver circuit 102, the lower bridge driver circuit 103, the PFC logic buffer circuit 104 and the PFC driver circuit 105.

In this embodiment, an input end of the voltage regulation module 108 is connected to the operating voltage input end VDD0, a control end of the voltage regulation module 108 is connected to the voltage regulation control input end RS, and an output end of the voltage regulation module 108 is respectively connected to the driving voltage input ends of the inverter logic buffer circuit 101, the upper bridge driver circuit 102, the lower bridge driver circuit 103, the PFC logic buffer circuit 104 and the PFC driver circuit 105. An output end of the inverter logic buffer circuit 101 is respectively connected to the input end of the upper bridge driver circuit 102 and the input end of the lower bridge driver circuit 103. An output end of the PFC logic buffer circuit 104 is connected to the input end of the PFC driver circuit 105. As shown in the drawing, IN1, IN2 and IN3 are upper bridge control input ends of the driver IC circuit 100; IN4, IN5 and IN6 are lower bridge control input ends of the driver IC circuit 100; IN7 is a PFC input end of the driver IC circuit 200 for the intelligent module. IN1, IN2, IN3, IN4, IN5, and IN6 are connected to the inverter logic buffer circuit 101; IN7 is connected to the PFC logic buffer circuit. HO1 is a first output end of the upper bridge driver circuit 102, HO2 is a second output end of the upper bridge driver circuit 102, and HO3 is a third output end of the upper bridge driver circuit 102. LO1 is a first output end of the lower bridge driver circuit 103, LO2 is a second output end of the lower bridge driver circuit 103, and LO3 is a third output end of the lower bridge driver circuit 103. PFCO is an output end of the PFC driver circuit 105. The first output end HO1, the second output end HO2, and the third output end HO3 of the upper bridge driver circuit 102 are respectively connected to control ends of corresponding upper bridge-arm switch transistors (not shown) in the intelligent power module. The first output end LO1, the second output end LO2, and the third output end LO3 of the lower bridge driver circuit 103 are respectively connected to control ends of corresponding lower bridge-arm switch transistors (not shown) in the intelligent power module. The output end PFCO of the PFC driver circuit 105 is connected to a control end of a PFC switch transistor (not shown) in the intelligent power module.

Figure 5:
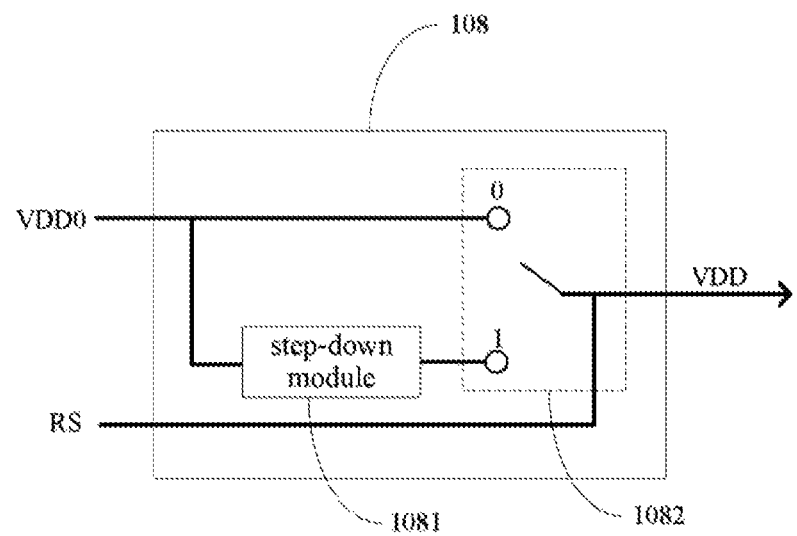
FIG. 5 is a structure diagram illustrating an exemplary of a voltage regulation module in the driver IC circuit of the intelligent power module according to the second embodiment.

FIG. 5 is a structure diagram illustrating an exemplary of a voltage regulation module in the driver IC circuit of the intelligent power module according to the second embodiment. Referring to FIGS. 4 and 5, in the embodiment, the voltage regulation module 108 includes a step-down module 1081 and a analog switch 1082. An input end of the step-down module 1081 is connected to the operating voltage input end VDD0, an output end of the step-down module 1081 is connected to a first input end (corresponding to the end 1 shown in FIG. 5) of the analog switch 1082, a second input end (corresponding to the end 0 shown in FIG. 5) of the analog switch 1082 is directly connected to the operating voltage input end VDD0, a common end of the analog switch 1082 is respectively connected to the driving voltage input ends of the inverter logic buffer circuit 101, the upper bridge driver circuit 102, the lower bridge driver circuit 103, the PFC logic buffer circuit 104 and the PFC driver circuit 105, the voltage of the common end of the analog switch 1082 is VDD, and a control end of the analog switch 1082 is connected to the voltage regulation control input end RS. In this embodiment, the voltage of the operating voltage input end is 20V.

In this embodiment, on condition that the voltage of the operating voltage input end is 20V, the upper bridge-arm switch transistor, the lower bridge-arm switch transistor and the PFC switch transistor are the Si-based power switching devices, the voltage regulation control signal of the voltage regulation input end RS can be controlled to switch the analog switch 1082 to the end labeled 1, so that the voltage regulation module 108 decreases the voltage of 20V input by the operating voltage input end VDD0, so as to output the driving voltages of 15V that are suitable for the Si-based power switching devices. In this embodiment, on condition that the upper bridge-arm switch transistor, the lower bridge-arm switch transistor and the PFC switch transistor are the SiC-based power switching devices, the voltage regulation control signal of the voltage regulation control input end RS can be controlled to switch the analog switch 1082 to the end labeled 0, so that the voltage regulation module 108 directly outputs the driving voltages of 20V that are suitable for the SiC-based power switching devices.

Figure 6:
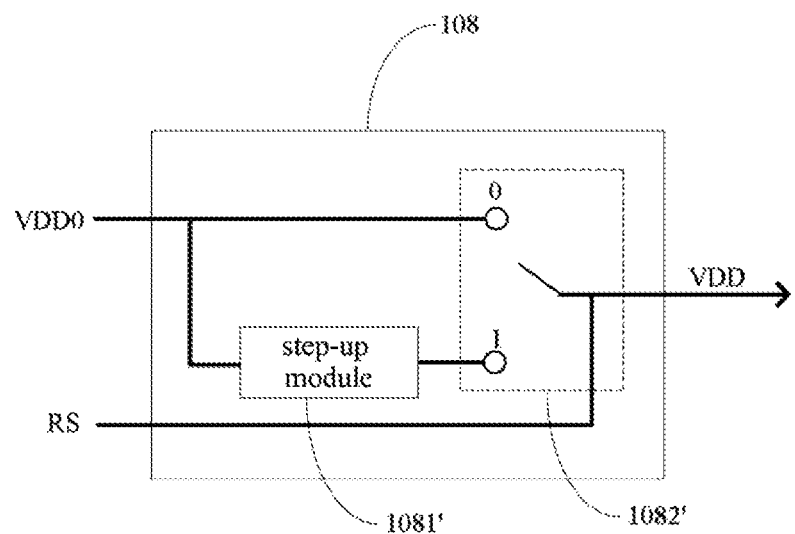
FIG. 6 is a structure diagram illustrating another exemplary of a voltage regulation module in the driver IC circuit of the intelligent power module according to the second embodiment.

FIG. 6 is a structure diagram illustrating another exemplary of a voltage regulation module in the driver IC circuit of the intelligent power module according to the second embodiment. Referring to FIGS. 4 and 6, in the embodiment, the voltage regulation module 108 includes a step-up module 1081' and a analog switch 1082'.

An input end of the step-up module 1081' is connected to the operating voltage input end VDD0, an output end of the step-up module 1081' is connected to a first input end (corresponding to the end 1 shown in FIG. 6) of the analog switch 1082', a second input end (corresponding to the end 0 shown in FIG. 6) of the analog switch 1082' is directly connected to the operating voltage input end VDD0, a common end of the analog switch 1082' is respectively connected to the driving voltage input ends of the inverter logic buffer circuit 101, the upper bridge driver circuit 102, the lower bridge driver circuit 103, the PFC logic buffer circuit 104 and the PFC driver circuit 105, and a control end of the analog switch 1082' is connected to the voltage regulation control input end RS.

In this embodiment, on condition that the voltage of the operating voltage input end is 15V, the upper bridge-arm switch transistor, the lower bridge-arm switch transistor and the PFC switch transistor are the Si-based power switching devices, the voltage regulation control signal of the voltage regulation input end RS can be controlled to switch the analog switch 1082' to the end labeled 0, so that the voltage regulation module 108 directly outputs the driving voltage of 15V that is suitable for the Si-based power switching devices. In this embodiment, on condition that the upper bridge-arm switch transistor, the lower bridge-arm switch transistor and the PFC switch transistor are the SiC-based power switching devices, the voltage regulation control signal of the voltage regulation control input end RS can be controlled to switch the analog switch 1082' to the end labeled 1, so that the voltage regulation module 108 increases the voltage of 15V input by the operating voltage input end VDD0, so as to output the driving voltages of 20V that are suitable for the SiC-based power switching devices.

As described above, as the voltage regulation module 108 in the driver IC circuit 200 can decrease the input voltage (corresponding to FIG. 5) or increase the input voltage (corresponding to FIG. 6), on condition that the upper bridge-arm switch transistor, the lower bridge-arm switch transistor and the PFC switch transistor are the Si-based power switching devices, or the upper bridge-arm switch transistor, the lower bridge-arm switch transistor and the PFC switch transistor are the SiC-based power switching devices, the voltage control signal of the voltage regulation control input end RS can be regulated to realize the switching between different driving voltages, thereby to solve the problem that the existing driver IC circuit of the intelligent power module cannot directly drive the SiC-based power switching devices. The driver IC circuit 200 of the intelligent power module in this embodiment can not only be applied to drive the conventional Si-based power switching device, such as the Si-based IGBT, but also be applied to drive the SiC-based power switching device, such as the wide bandgap power switching device, e.g., the SiC-based MOSFET, thus, suitable for the device in which all the switch transistors use the traditional Si-based power switching devices or use the SiC-based power switching devices. The driver IC circuit 200 of the intelligent power module in this embodiment has a large flexibility, and the difficulty of the electronic control design is also reduced, which is beneficial to the performance of the SiC-based power switching device.

Figure 7:
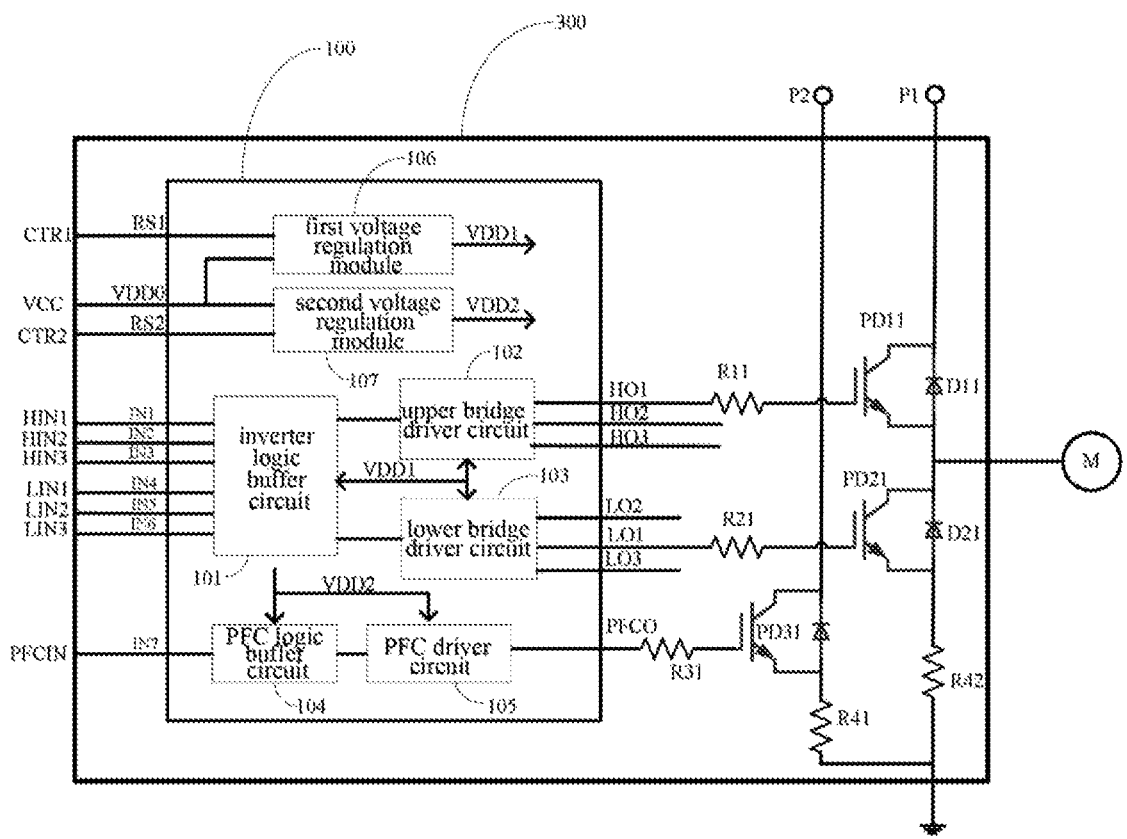
FIG. 7 is a structure diagram illustrating an intelligent power module according to a first embodiment of the present disclosure.

The present disclosure further provides an intelligent power module. FIG. 7 is a structure diagram illustrating an intelligent power module according to a first embodiment of the present disclosure. Referring to FIG. 7, the intelligent power module 300 includes a power input end VCC of a low voltage region, a first voltage regulation end CTR1, a second voltage regulation end CRT2, a first upper bridge-arm control input end HIN1, a second upper bridge-arm control input end HIN2, a third upper bridge-arm control input end HIN3, a first lower bridge-arm control input end LIN1, a second lower bridge-arm control input end LIN2, a third lower bridge-arm control input end LIN3, a PFC control input end PFCIN, a plurality of resistors (such as, the resistors R11, R21, R31, R41, and R42 shown in FIG. 7), a first upper bridge-arm switch transistor PD11, a second upper bridge-arm switch transistor (not shown), a third upper bridge-arm switch transistor (not shown), a first lower bridge-arm switch transistor PD21, a second lower bridge-arm switch transistor (not shown), a third lower bridge-arm switch transistor (not shown), a PFC switch transistor PD31, and the driver IC circuit 100 as described above (namely the driver IC circuit 100 as shown in FIG. 1).

Referring to FIGS. 7 and 1, in this embodiment, the power input end VCC of the low voltage region is connected to the operating voltage input end VDD0 of the driver IC circuit 100. The first voltage regulation end CTR1 is connected to the first voltage regulation control input end RS1 of the driver IC circuit 100, the second voltage regulation end CTR2 is connected to the second voltage regulation control input end RS2 of the driver IC circuit 100. The first upper bridge-arm control input end HIN1 is connected to the end IN1 of the driver IC circuit 100, the second upper bridge-arm control input end HIN2 is connected to the end IN2 of the driver IC circuit 100, and the third upper bridge-arm control input end HIN3 is connected to the end IN3 of the driver IC circuit 100. The first lower bridge-arm control input end LIN1 is connected to the end IN4 of the driver IC circuit 100, the second lower bridge-arm control input end LIN2 is connected to the end IN5 of the driver IC circuit 100, and the third lower bridge-arm control input end LIN3 is connected to the end IN6 of the driver IC circuit 100. The PFC control input end PFCIN is connected to the end IN7 of the driver IC circuit 100. A first output end HO1 of the upper bridge driver circuit 102 in the driver IC circuit 100 is connected to a control end of the first upper bridge-arm switch transistor PD11 via the resistor R11, a second output end HO2 of the upper bridge driver circuit 102 is connected to a control end of the second upper bridge-arm switch transistor (the connection of the second upper bridge-arm switch transistor is not shown, which can refer to the first upper bridge-arm switch transistor PD11) via one resistor (not shown), and a third output end HO3 of the upper bridge driver circuit 102 is connected to a control end of the third upper bridge-arm switch transistor (the connection of the third upper bridge-arm switch transistor is not shown, which can refer to the first upper bridge-arm switch transistor PD11) via one resistor (not shown). A first output end LO1 of the lower bridge driver circuit 103 is connected to a control end of the first lower bridge-arm switch transistor PD21 via the resistor R21, a second output end LO2 of the lower bridge driver circuit 103 is connected to a control end of the second lower bridge-arm switch transistor (the connection of the second lower bridge-arm switch transistor is not shown, which can refer to the first lower bridge-arm switch transistor PD21) via one resistor (not shown), and a third output end LO3 of the lower bridge driver circuit 103 is connected to a control end of the third lower bridge-arm switch transistor (the connection of the third lower bridge-arm switch transistor is not shown, which can refer to the first lower bridge-arm switch transistor PD21) via one resistor (not shown). The output end PFCO of the PFC driver circuit 105 is connected to a control end of the PFC switch transistor PD31 via the resistor R31. In this embodiment, the first upper bridge-arm switch transistor PD11, the second upper bridge-arm switch transistor (not shown), the third upper bridge-arm switch transistor (not shown), the first lower bridge-arm switch transistor PD21, the second lower bridge-arm switch transistor (not shown), the third lower bridge-arm switch transistor (not shown), and the PFC switch transistor PD31 are the Si-based IGBTs or the SiC-based MOSFETs. Optionally, in this embodiment, the first upper bridge-arm switch transistor PD11, the second upper bridge-arm switch transistor (not shown), the third upper bridge-arm switch transistor (not shown), the first lower bridge-arm switch transistor PD21, the second lower bridge-arm switch transistor (not shown), and the third lower bridge-arm switch transistor (not shown) are the Si-based IGBTs, the PFC switch transistor PD31 is the SiC-based MOSFET. In this embodiment, the voltage of the power input end VCC of the low voltage region is 15V or 20V.

In this embodiment, the intelligent power module 300 further includes a first power input end P1 of a high voltage region, a second power input end P2 of the high voltage region, a plurality of flyback diodes (such as, the D11 and D21 as shown in FIG. 7). On condition that the first upper bridge-arm switch transistor PD11, the second upper bridge-arm switch transistor (not shown), the third upper bridge-arm switch transistor (not shown), the first lower bridge-arm switch transistor PD21, the second lower bridge-arm switch transistor (not shown), the third lower bridge-arm switch transistor (not shown) are the Si-based IGBTs, and the PFC switch transistor PD31 is the SiC-based MOSFET, the collector of the first upper bridge-arm switch transistor PD11, the collector of the second upper bridge-arm switch transistor (not shown), the collector of the third upper bridge-arm switch transistor (not shown) are connected to the first power input end P1 of the high voltage region; the emitter of the first upper bridge-arm switch transistor PD11 is connected to the collector of the first lower bridge-arm switch transistor PD21, the emitter of the second upper bridge-arm switch transistor (not shown) is connected to the collector of the second lower bridge-arm switch transistor PD21, and the emitter of the third upper bridge-arm switch transistor (not shown) is connected to the collector of the third lower bridge-arm switch transistor (not shown); in addition, the emitter of the first lower bridge-arm switch transistor PD21, the emitter of the second lower bridge-arm switch transistor (not shown), and the emitter of the third lower bridge-arm switch transistor (not shown) are all grounded via the resistor R42. In this embodiment, on condition that the PFC switch transistor PD31 is the SiC-based NMOS, the drain of the PFC switch transistor PD31 is connected to the second power input end P2 of the high voltage region, the source of the PFC switch transistor PD31 is grounded via the resistor R41. The cathode of the flyback diode D11 is connected to the collector of the first upper bridge-arm switch transistor PD11, the anode of the flyback diode D11 is connected to the emitter of the first upper bridge-arm switch transistor PD11. The cathode of the flyback diode D21 is connected to the collector of the first lower bridge-arm switch transistor PD21, the anode of the flyback diode D21 is connected to the emitter of the first lower bridge-arm switch transistor PD21. Similarly, one flyback diode (not shown) is connected between the collector and the emitter of each of the second upper bridge-arm switch transistor, the third upper bridge-arm switch transistor, the second lower bridge-arm switch transistor, and the third lower bridge-arm switch transistor. In this embodiment, a connection node between the first upper bridge-arm switch transistor PD11 and the first lower bridge-arm switch transistor PD21, a connection node between the second upper bridge-arm switch transistor and the second lower bridge-arm switch transistor, and a connection node between the third upper bridge-arm switch transistor and the third lower bridge-arm switch transistor are all connected to a motor M.

In the driver IC circuit 100 of the intelligent power module 300 according to this embodiment, as the first voltage regulation module 106 and the second voltage regulation module 107 both can decrease the input voltage or increase the input voltage, the voltage control signals of the first voltage regulation control input end RS1 and the second voltage regulation control input end RS2 can be regulated to realize the switching between different driving voltages, thereby to solve the problem that the existing driver IC circuit of the intelligent power module cannot directly drive the SiC-based power switching devices. The driver IC circuit 100 of the intelligent power module in this embodiment can not only be applied to drive the conventional Si-based power switching device, such as the Si-based IGBT, but also be applied to drive the SiC-based power switching device, such as the wide bandgap power switching device, e.g., the SiC-based MOSFET, thus, suitable for the device in which all the switch transistors use the traditional Si-based power switching devices or use the SiC-based power switching devices. The intelligent power module 300 in this embodiment has a large flexibility, and the difficulty of the electronic control design is also reduced, which is beneficial to the performance of the SiC-based power switching device.

Figure 8:
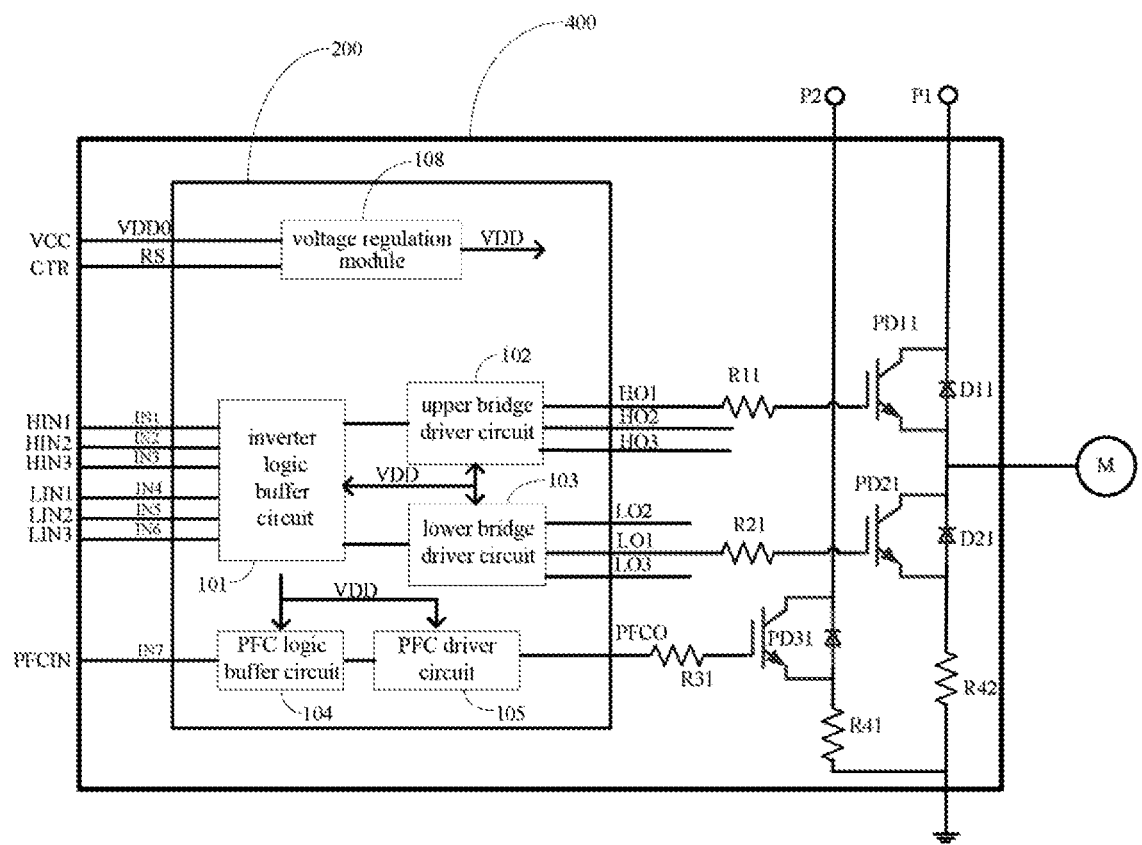
FIG. 8 is a structure diagram illustrating an intelligent power module according to a second embodiment of the present disclosure.

FIG. 8 is a structure diagram illustrating an intelligent power module according to a second embodiment of the present disclosure. Referring to FIG. 8, the intelligent power module 400 includes a power input end VCC of a low voltage region, a voltage regulation end CTR, a first upper bridge-arm control input end HIN1, a second upper bridge-arm control input end HIN2, a third upper bridge-arm control input end HIN3, a first lower bridge-arm control input end LIN1, a second lower bridge-arm control input end LIN2, a third lower bridge-arm control input end LIN3, a PFC control input end PFCIN, a plurality of resistors (such as, the resistors R11, R21, R31, R41, and R42 shown in FIG. 8), a first upper bridge-arm switch transistor PD11, a second upper bridge-arm switch transistor (not shown), a third upper bridge-arm switch transistor (not shown), a first lower bridge-arm switch transistor PD21, a second lower bridge-arm switch transistor (not shown), a third lower bridge-arm switch transistor (not shown), a PFC switch transistor PD31, and a driver IC circuit 200 as described above (namely the driver IC circuit 200 as shown in FIG. 4).

Referring to FIGS. 8 and 4, in this embodiment, the power input end VCC of the low voltage region is connected to the operating voltage input end VDD0 of the driver IC circuit 200. The voltage regulation end CTR is connected to the voltage regulation control input end RS of the driver IC circuit 200. The connections of other components in this embodiment are similar to those as described above, thus are not detailed herein.

It should be noted that, in this embodiment, the first upper bridge-arm switch transistor PD11, the second upper bridge-arm switch transistor (not shown), the third upper bridge-arm switch transistor (not shown), the first lower bridge-arm switch transistor PD21, the second lower bridge-arm switch transistor (not shown), the third lower bridge-arm switch transistor (not shown), and the PFC switch transistor PD31 are the Si-based IGBTs. Additionally or alternatively, the first upper bridge-arm switch transistor PD11, the second upper bridge-arm switch transistor (not shown), the third upper bridge-arm switch transistor (not shown), the first lower bridge-arm switch transistor PD21, the second lower bridge-arm switch transistor (not shown), the third lower bridge-arm switch transistor (not shown), and the PFC switch transistor PD31 are the SiC-based MOSFETs.

In this embodiment, on condition that the voltage of the power input end VCC of the low voltage region is 15V, the driver IC circuit 200 uses the voltage regulation module 108 as shown in FIG. 6. Specifically, on condition that the first upper bridge-arm switch transistor PD11, the second upper bridge-arm switch transistor (not shown), the third upper bridge-arm switch transistor (not shown), the first lower bridge-arm switch transistor PD21, the second lower bridge-arm switch transistor (not shown), the third lower bridge-arm switch transistor (not shown), and the PFC switch transistor PD31 are the Si-based IGBTs, the voltage regulation control of the voltage regulation control input end RS can be controlled to switch the analog switch 1082' in the voltage regulation module 108 to the end labeled 0, so that the voltage regulation module 108 directly outputs the driving voltages of 15V that are suitable for the Si-based power switching devices. In this embodiment, on condition that the first upper bridge-arm switch transistor PD11, the second upper bridge-arm switch transistor (not shown), the third upper bridge-arm switch transistor (not shown), the first lower bridge-arm switch transistor PD21, the second lower bridge-arm switch transistor (not shown), the third lower bridge-arm switch transistor (not shown), and the PFC switch transistor PD31 are the SiC-based power switching devices, the voltage regulation control of the voltage regulation control input end RS can be controlled to switch the analog switch 1082' in the voltage regulation module 108 to the end labeled 1, so that the voltage regulation module 108 increases the voltage of 15V input by the operating voltage input end VDD0, so as to output the driving voltages of 20V that are suitable for the SiC-based power switching devices.

In this embodiment, on condition that the voltage of the power input end VCC of the low voltage region is 20V, the driver IC circuit 200 uses the voltage regulation module 108 as shown in FIG. 5. Specifically, on condition that the first upper bridge-arm switch transistor PD11, the second upper bridge-arm switch transistor (not shown), the third upper bridge-arm switch transistor (not shown), the first lower bridge-arm switch transistor PD21, the second lower bridge-arm switch transistor (not shown), the third lower bridge-arm switch transistor (not shown), and the PFC switch transistor PD31 are the Si-based power switching devices, the voltage regulation control of the voltage regulation control input end RS can be controlled to switch the analog switch 1082 in the voltage regulation module 108 to the end labeled 1, so that the voltage regulation module 108 decreases the input voltage of 20V, so as to output the driving voltages of 15V that are suitable for the Si-based power switching devices. In this embodiment, on condition that the first upper bridge-arm switch transistor PD11, the second upper bridge-arm switch transistor (not shown), the third upper bridge-arm switch transistor (not shown), the first lower bridge-arm switch transistor PD21, the second lower bridge-arm switch transistor (not shown), the third lower bridge-arm switch transistor (not shown), and the PFC switch transistor PD31 are the SiC-based power switching devices, the voltage regulation control of the voltage regulation control input end RS can be controlled to switch the analog switch 1082 in the voltage regulation module 108 to the end labeled 0, so that the voltage regulation module 108 directly outputs the driving voltages of 20V that are suitable for the SiC-based power switching devices.

As described above, as the voltage regulation module 108 in the driver IC circuit 200 of the intelligent power module 400 can decrease the input voltage (corresponding to FIG. 5) or increase the input voltage (corresponding to FIG. 6), on condition that the first upper bridge-arm switch transistor PD11, the second upper bridge-arm switch transistor (not shown), the third upper bridge-arm switch transistor (not shown), a first lower bridge-arm switch transistor PD21, a second lower bridge-arm switch transistor (not shown), a third lower bridge-arm switch transistor (not shown), and the PFC switch transistor PD31 are the Si-based power switching devices, or the first upper bridge-arm switch transistor PD11, the second upper bridge-arm switch transistor (not shown), the third upper bridge-arm switch transistor (not shown), a first lower bridge-arm switch transistor PD21, a second lower bridge-arm switch transistor (not shown), a third lower bridge-arm switch transistor (not shown), and the PFC switch transistor PD31 are the SiC-based power switching devices, the voltage control signal of the voltage regulation control input end RS can be regulated to realize the switching between different driving voltages, thereby to solve the problem that the existing driver IC circuit of the intelligent power module cannot directly drive the SiC-based power switching devices. The driver IC circuit 200 of the intelligent power module in this embodiment can not only be applied to drive the conventional Si-based power switching device, such as the Si-based IGBT, but also be applied to drive the SiC-based power switching device, such as the wide bandgap power switching device, e.g., the SiC-based MOSFET, and thus, suitable for the device in which all the switch transistors use the traditional Si-based power switching devices or use the SiC-based power switching devices. The intelligent power module 400 in this embodiment is beneficial to the performance of the SiC-based power switching device.

The present disclosure provides a driver IC circuit 500 of an intelligent power module, which improves the integration of the intelligent power module, thereby reducing the cost thereof and improve the reliability thereof.

Figure 9:
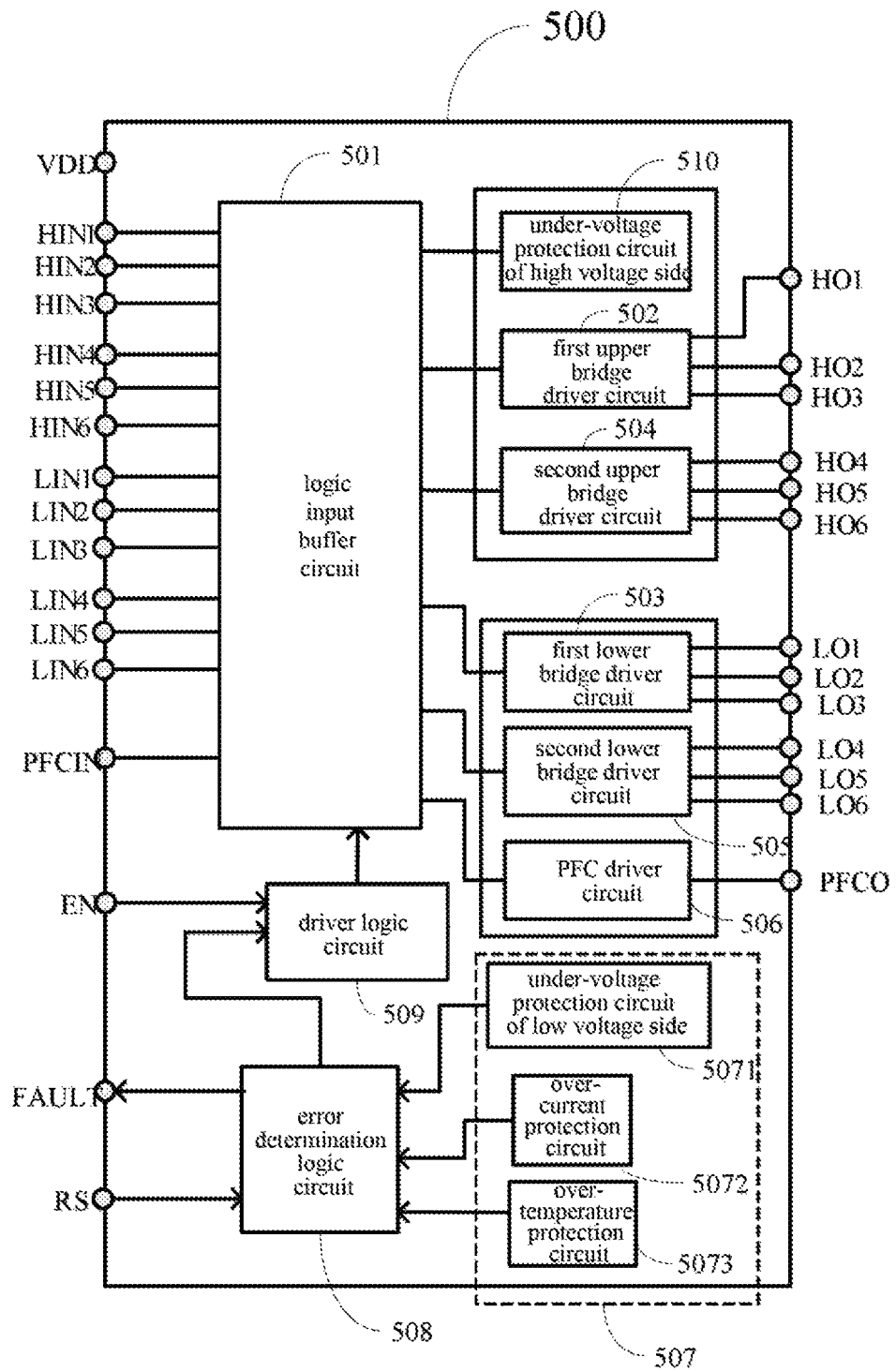
FIG. 9 is a structure diagram illustrating a driver IC circuit of an intelligent power module according to a third embodiment of the present disclosure.

FIG. 9 is a structure diagram illustrating a driver IC circuit of an intelligent power module according to a third embodiment of the present disclosure. Referring to FIG. 9, in this embodiment, the driver IC circuit 500 of the intelligent power module includes a first upper bridge control signal input end HIN1, a second upper bridge control signal input end HIN2, a third upper bridge control signal input end HIN3, a fourth upper bridge control signal input end HIN4, a fifth upper bridge control signal input end HIN5, a sixth upper bridge control signal input end HIN6, a first lower bridge control signal input end LIN1, a second lower bridge control signal input end LIN2, a third lower bridge control signal input end LIN3, a fourth lower bridge control signal input end LIN4, a fifth lower bridge control signal input end LIN5, a sixth lower bridge control signal input end LIN6, a PFC control signal input end PFCIN, a logic input buffer circuit 501, a first upper bridge driver circuit 502, a first lower bridge driver circuit 503, a second upper bridge driver circuit 504, a second lower bridge driver circuit 505, and a PFC driver circuit 506.

The logic input buffer circuit 501 is configured to perform a full-wave filtering process on control signals input by the first upper bridge control signal input end HIN1, the second upper bridge control signal input end HIN2, and the third upper bridge control signal input end HIN3, and is further configured to output a processed control signal to the first upper bridge driver circuit 502. The logic input buffer circuit 501 is further configured to perform the full-wave filtering process on control signals input by the first lower bridge control signal input end LIN1, the second lower bridge control signal input end LIN2, and the third lower bridge control signal input end LIN3, and is further configured to output a processed control signal to the first lower bridge driver circuit 503. The logic input buffer circuit 501 is further configured to perform the full-wave filtering process on control signals input by the fourth upper bridge control signal input end HIN4, the fifth upper bridge control signal input end HIN5, and the sixth upper bridge control signal input end HIN6, and is additionally configured to output a processed control signal to the second upper bridge driver circuit 504. The logic input buffer circuit 501 is further configured to perform the full-wave filtering process on control signals input by the fourth lower bridge control signal input end LIN4, the fifth lower bridge control signal input end LIN5, and the sixth lower bridge control signal input end LIN6, and is additionally configured to output a processed control signal to the second lower bridge driver circuit 505. The logic input buffer circuit 501 is further configured to perform the full-wave filtering process on a control signal input by the PFC control signal input end PFCIN, and is additionally configured to output a processed control signal to the PFC driver circuit 506.

The first upper bridge driver circuit 502 is configured to drive upper bridge-arm switch transistors (not shown) corresponding to a first external motor (not shown), according to the control signal output by the logic input buffer circuit 501. It should be noted that the upper bridge-arm switch transistors corresponding to the first external motor includes three transistors. Thus, the first upper bridge driver circuit 502 includes a first output end HO1, a second output end HO2, and a third output end HO3.

The first lower bridge driver circuit 503 is configured to drive lower bridge-arm switch transistors (not shown) corresponding to the first external motor, according to the control signal output by the logic input buffer circuit 501. It should be noted that the lower bridge-arm switch transistors corresponding to the first external motor also includes three transistors. Thus, the first lower bridge driver circuit 503 includes a first output end LO1, a second output end LO2, and a third output end LO3.

The second upper bridge driver circuit 504 is configured to drive upper bridge-arm switch transistors (not shown) corresponding to a second external motor (not shown), according to the control signal output by the logic input buffer circuit 501. It should be noted that the upper bridge-arm switch transistors corresponding to the second external motor includes three transistors. Thus, the second upper bridge driver circuit 504 includes a first output end HO4, a second output end HO5, and a third output end HO6.

The second lower bridge driver circuit 505 is configured to drive lower bridge-arm switch transistors (not shown) corresponding to the second external motor, according to the control signal output by the logic input buffer circuit 501. It should be noted that the lower bridge-arm switch transistors corresponding to the second external motor also includes three transistors. Thus, the second lower bridge driver circuit 505 includes a first output end LO4, a second output end LO5, and a third output LO6.

The PFC driver circuit 506 is configured to drive an external PFC switch transistor (not shown), according to the control signal output by the logic input buffer circuit 501. An output end of PFC driver circuit 506 is the end PFCO.

In this embodiment, the driver IC circuit 500 of the intelligent power module further includes an enable end EN, an error signal output end FAULT, a reset end RS, a protection circuit 507, an error determination logic circuit 508 and a driver logic circuit 509. The driver IC circuit 500 is reset in response to receiving a reset signal input by the reset end RS.

Specifically, the protection circuit 507 is configured to output a first under-voltage protection signal to the error determination logic circuit 508, on condition that the power input end VDD of the low voltage side in the driver IC circuit 500 is in the under-voltage state. Alternatively, the protection circuit 507 is configured to output an over-current protection signal to the error determination logic circuit 508, on condition that any of the switch transistors is in an over-current state. Alternatively, the protection circuit 507 is configured to output an over-temperature protection signal to the error determination logic circuit 508, on condition that the intelligent power module is in an over-temperature state.

The error determination logic circuit 508 is configured to output an error signal to the error signal output end FAULT, in response to receiving the first under-voltage protection signal, or/and, the over-current protection signal, or/and, the over-temperature protection signal.

The driver logic circuit 509 is configured to output a turning-on signal to the logic input buffer circuit 501, on condition that the error determination logic circuit 508 does not output the error signal and the enable end EN inputs an enable signal, so as to control the first upper bridge driver circuit 502, the first lower bridge driver circuit 503, the second upper bridge driver circuit 504, the second lower bridge driver circuit 505, and the PFC driver circuit 506 to be in operation.

In this embodiment, the protection circuit 507 includes a under-voltage protection circuit 5071 of the low voltage side, an over-current protection circuit 5072, and an over-temperature protection circuit 5073.

The under-voltage protection circuit 5071 of the low voltage side is configured to output a first under-voltage protection signal to the error determination logic circuit 508, on condition that the power input end VDD of the low voltage side is in the under-voltage state.

The over-current protection circuit 5072 is configured to output an over-current protection signal to the error determination logic circuit 508, on condition that any of the transistors is in the over-current state.

The over-temperature protection circuit 5073 is configured to output an over-temperature protection signal to the error determination logic circuit 508, on condition that the intelligent power module is in the over-temperature state.

In this embodiment, the driver IC circuit 500 of the intelligent power module further includes a under-voltage protection circuit 510 of a high voltage side. The under-voltage protection circuit 510 of the high voltage side is configured to output a second under-voltage protection signal to the logic input buffer circuit 510, on condition that a power input end of the high voltage side in the driver IC circuit 500 is in the under-voltage state, so as to control the first upper bridge driver circuit 502, the first lower bridge driver circuit 503, the second upper bridge driver circuit 504, the second lower bridge driver circuit 505, and the PFC driver circuit 506 to be out of operation.

In the driver IC circuit 500 of the intelligent power module according to this embodiment, the first upper bridge driver circuit 502 for driving the upper bridge-arm switch transistors corresponding to the first external motor, the first lower bridge driver circuit 503 for driving the lower bridge-arm switch transistors corresponding to the first external motor, the second upper bridge driver circuit 504 for driving the upper bridge-arm switch transistors corresponding to the second external motor, the second lower bridge driver circuit 505 for driving the lower bridge-arm switch transistors corresponding to the second external motor, and the PFC driver circuit 506 are all integrated in a same IC chip. Therefore, the integration of the intelligent power module is improved, which reduces the cost and improves the reliability of the intelligent power module.

Figure 10:
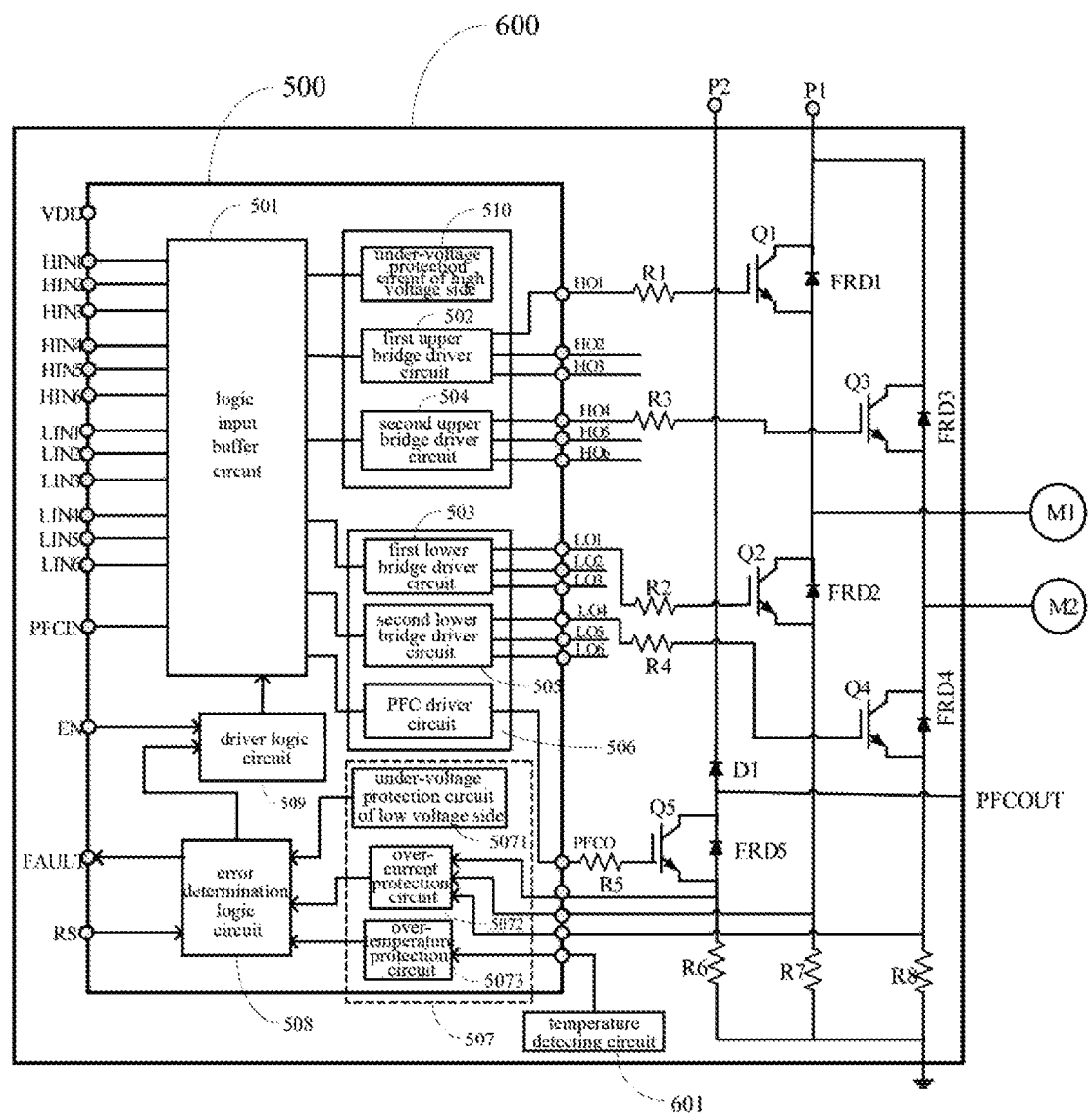
FIG. 10 is a structure diagram illustrating an intelligent power module according to a third embodiment of the present disclosure.

The present disclosure also provides an intelligent power module. FIG. 10 is a structure diagram illustrating an intelligent power module according to a third embodiment of the present disclosure. Referring to FIGS. 9 and 10, the intelligent power module 600 includes a PFC switch transistor Q5, a plurality of resistors (such as, resistors R1, R2, R3, R4, and R5), a first upper bridge-arm switch transistor Q1, a second upper bridge-arm switch transistor (not shown), a third upper bridge-arm switch transistor (not shown), a first lower bridge-arm switch transistor Q2, a second lower bridge-arm switch transistor (not shown), and a third lower bridge-arm switch transistor (not shown) that correspond to a first external motor M1, a fourth upper bridge-arm switch transistor Q3, a fifth upper bridge-arm switch transistor (not shown), a sixth upper bridge-arm switch transistor (not shown), a fourth lower bridge-arm switch transistor Q4, a fifth lower bridge-arm switch transistor (not shown), and a sixth lower bridge-arm switch transistor (not shown) that correspond to a second external motor M2, and the driver IC circuit 500 of the intelligent power module as shown in FIG. 9.

Specifically, in this embodiment, a first output end HO1 of the first upper bridge driver circuit 502 is connected to a control end of the first upper bridge-arm switch transistor Q1 via the resistor R1, a second output end HO2 of the first upper bridge driver circuit 502 is connected to a control end of the second upper bridge-arm switch transistor (the structure of the second upper bridge-arm switch transistor is not shown, which can refer to the first upper bridge-arm switch transistor Q1) via one resistor (not shown), and a third output end HO3 of the first upper bridge driver circuit 502 is connected to a control end of the third upper bridge-arm switch transistor (the structure of the third upper bridge-arm switch transistor is not shown, which can refer to the first upper bridge-arm switch transistor Q1) via one resistor (not shown). A first output end LO1 of the first lower bridge driver circuit 503 is connected to a control end of the first upper bridge-arm switch transistor Q2 via the resistor R2, a second output end LO2 of the first lower bridge driver circuit 503 is connected to a control end of the second lower bridge-arm switch transistor (the structure of the second lower bridge-arm switch transistor is not shown, which can refer to the first lower bridge-arm switch transistor Q2) via one resistor (not shown), and a third output end LO3 of the first lower bridge driver circuit 503 is connected to a control end of the third lower bridge-arm switch transistor (the structure of the third lower bridge-arm switch transistor is not shown, which can refer to the first lower bridge-arm switch transistor Q2) via one resistor (not shown).

A first output end HO4 of the second upper bridge driver circuit 504 is connected to a control end of the fourth upper bridge-arm switch transistor Q3 via the resistor R3, a second output end HO5 of the second upper bridge driver circuit 504 is connected to a control end of the fifth upper bridge-arm switch transistor (the structure of the fifth upper bridge-arm switch transistor is not shown, which can refer to the fourth upper bridge-arm switch transistor Q3) via one resistor (not shown), and a third output end HO6 of the second upper bridge driver circuit 504 is connected to a control end of the sixth upper bridge-arm switch transistor (the structure of the sixth upper bridge-arm switch transistor is not shown, which can refer to the fourth upper bridge-arm switch transistor Q3) via one resistor (not shown). A first output end LO4 of the second lower bridge driver circuit 505 is connected to a control end of the fourth lower bridge-arm switch transistor Q4 via the resistor R4, a second output end LO5 of the second lower bridge driver circuit 505 is connected to a control end of the fifth lower bridge-arm switch transistor (the structure of the fifth lower bridge-arm switch transistor is not shown, which can refer to the fourth lower bridge-arm switch transistor Q4) via one resistor (not shown), and a third output end LO6 of the second lower bridge driver circuit 505 is connected to a control end of the sixth lower bridge-arm switch transistor (the structure of the sixth lower bridge-arm switch transistor is not shown, which can refer to the fourth lower bridge-arm switch transistor Q4) via one resistor (not shown). In this embodiment, the output end PFCO of the PFC driver circuit 506 is connected to a control end of the PFC switch transistor Q5 via the resistor R5. In this embodiment, the power input end VDD of the low voltage side in the driver IC circuit 500 supplies the driving voltages to the first external motor M1, the second external motor M2, and the PFC driver circuit 506.

In this embodiment, the intelligent power module 600 further includes a first current sampling resistor R6, a second current sampling resistor R7, and a third current sampling resistor R8. A first end of the first current sampling resistor R6 is connected to a current output end of the PFC switch transistor Q5, a second end of the first current sampling resistor R6 is grounded. A first end of the second current sampling resistor R7 is respectively connected to current output ends of the first lower bridge-arm switch transistor Q2, the second lower bridge-arm switch transistor (not shown), and the third lower bridge-arm switch transistor (not shown), and a second end of the second current sampling resistor R7 is grounded. A first end of the third current sampling resistor R8 is respectively connected to current output ends of the fourth lower bridge-arm switch transistor Q4, the fifth lower bridge-arm switch transistor (not shown), and the sixth lower bridge-arm switch transistor (not shown), and a second end of the third current sampling resistor R8 is grounded. In this embodiment, the first end of the first current sampling resistor R6 is further connected to the first input end of the over-current protection circuit 5072, the first end of the second current sampling resistor R7 is further connected to the second input end of the over-current protection circuit 5072, and the first end of the third current sampling resistor R8 is further connected to the third input end of the over-current protection circuit 5072.

In this embodiment, the intelligent power module 600 further includes a temperature detecting circuit 601 configured to detect a temperature of the intelligent power module 600. The temperature detecting circuit 601 is connected to the input end of the over-temperature protection circuit 5073 in the driver IC circuit 500.

In this embodiment, the PFC switch transistor Q5, the first upper bridge-arm switch transistor Q1, the second upper bridge-arm switch transistor (not shown), the third upper bridge-arm switch transistor (not shown), the first lower bridge-arm switch transistor Q2, the second lower bridge-arm switch transistor (not shown), the third lower bridge-arm switch transistor (not shown), the fourth upper bridge-arm switch transistor Q3, the fifth upper bridge-arm switch transistor (not shown), the sixth upper bridge-arm switch transistor (not shown), the fourth lower bridge-arm switch transistor Q4, the fifth lower bridge-arm switch transistor (not shown), and the sixth lower bridge-arm switch transistor (not shown) are the IGBTs.

In this embodiment, the intelligent power module 600 further includes a first power input end P1 of the high voltage region, a second power input end P2 of the high voltage region, a plurality of flyback diodes (such as, the flyback diodes FRD1, FRD2, FRD3, FRD4, and FRD5), a PFC signal output end PFCOUT, and a first diode D1. Specifically, in this embodiment, a collector of the first upper bridge-arm switch transistor Q1, a collector of the second upper bridge-arm switch transistor (not shown), a collector of the third upper bridge-arm switch transistor (not shown), a collector of the fourth upper bridge-arm switch transistor Q3, a collector of the fifth upper bridge-arm switch transistor (not shown), and a collector of the sixth upper bridge-arm switch transistor (not shown) are connected to the first power input end P1 of the high voltage region. An emitter of the first upper bridge-arm switch transistor Q1 is connected to a collector of the first lower bridge-arm switch transistor Q2, an emitter of the second upper bridge-arm switch transistor (not shown) is connected to a collector of the second lower bridge-arm switch transistor (not shown), an emitter of the third upper bridge-arm switch transistor is connected to a collector of the third lower bridge-arm switch transistor (not shown), an emitter of the fourth upper bridge-arm switch transistor Q3 is connected to a collector of the fourth lower bridge-arm switch transistor Q4, an emitter of the fifth upper bridge-arm switch transistor (not shown) is connected to a collector of the fifth lower bridge-arm switch transistor (not shown), an emitter of the sixth upper bridge-arm switch transistor (not shown) is connected to a collector of the sixth lower bridge-arm switch transistor (not shown). An emitter of the first lower bridge-arm switch transistor Q2, an emitter of the second lower bridge-arm switch transistor (not shown), and an emitter of the third lower bridge-arm switch transistor (not shown) are connected to a first end of the second current sampling resistor R7. An emitter of the fourth lower bridge-arm switch transistor Q4, an emitter of the fifth lower bridge-arm switch transistor (not shown), and an emitter of the sixth lower bridge-arm switch transistor (not shown) are connected to a first end of the third current sampling resistor R8. A collector of the PFC switch transistor Q5 is respectively connected to the PFC signal output end PFCOUT and an anode of the first diode D1. A cathode of the first diode D1 is connected to the second power input end P2 of the high voltage region. An emitter of the PFC switch transistor Q5 is connected to the first end of the first current sampling resistor R6.

In this embodiment, the cathode of the flyback diode FRD1 is connected to the collector of the first upper bridge-arm switch transistor Q1, and the anode of the flyback diode FRD1 is connected to the emitter of the first upper bridge-arm switch transistor Q1. The cathode of the flyback diode FRD2 is connected to the collector of the first lower bridge-arm switch transistor Q2, and the anode of the flyback diode FRD2 is connected to the emitter of the first lower bridge-arm switch transistor Q2. The cathode of the flyback diode FRD3 is connected to the collector of the fourth upper bridge-arm switch transistor Q3, and the anode of the flyback diode FRD3 is connected to the emitter of the fourth upper bridge-arm switch transistor Q3. The cathode of the flyback diode FRD4 is connected to the collector of the fourth lower bridge-arm switch transistor Q4, and the anode of the flyback diode FRD4 is connected to the emitter of the fourth lower bridge-arm switch transistor Q4. Similarly, one flyback diode is connected between the collector and the emitter of each of other switch transistors, thus are not detailed herein.

In this embodiment, a connection node between the first upper bridge-arm switch transistor Q1 and the first lower bridge-arm switch transistor Q2, a connection node between the second upper bridge-arm switch transistor and the second lower bridge-arm switch transistor, and a connection node between the third upper bridge-arm switch transistor and the third lower bridge-arm switch transistor are connected to the first external motor M1. A connection node between the fourth upper bridge-arm switch transistor Q3 and the fourth lower bridge-arm switch transistor Q4, a connection node between the fifth upper bridge-arm switch transistor and the fifth lower bridge-arm switch transistor, and a connection node between the sixth upper bridge-arm switch transistor and the sixth lower bridge-arm switch transistor are connected to the second external motor M2. In case that the intelligent power module 600 in this embodiment is applied to an air conditioner (such as, an inverter air conditioner), the first motor M1 may be a fan of the air conditioner, and the second motor M2 may be a compressor of the air conditioner.

In the intelligent power module 600 according to this embodiment, the first upper bridge driver circuit 502, the first lower bridge driver circuit 503, the second upper bridge driver circuit 504, the second lower bridge driver circuit 505, and the PFC driver circuit 506 are all integrated in a same IC chip. Therefore, the intelligent power module 600 in this embodiment further improves the integration of the intelligent power module, thereby reducing the cost of the intelligent power module. In addition, the intelligent power module 600 in this embodiment uses the same protection circuit 507 for the first external motor M1, the second external motor M2, and the PFC switch transistor Q5. Specifically, on condition that the power input end VDD of the low voltage side in the driver IC circuit 500 is in the under-voltage state, the under-voltage protection circuit 5071 of the low voltage side outputs the first under-voltage protection signal to the error determination logic circuit 508. On condition that any one of the switch transistors is in the over-current condition, the over-current protection circuit 5072 outputs the over-current protection signal to the error determination logic circuit 508. On condition that the temperature of the intelligent power module 600 is too high, the over-temperature protection circuit 5073 outputs the over-temperature protection signal to the error determination logic circuit 508. The error determination logic circuit 508 outputs the error signal to the error signal output end FAULT, in response to receiving the first under-voltage protection signal, the over-current protection signal, or/and the over-temperature protection signal. On condition that an external controller (not shown) connected to the error signal output end FAULT receives the error signal, the external controller outputs a corresponding control signal to the driver IC circuit 500, so as to control the first upper bridge driver circuit 502, the first lower bridge driver circuit 503, the second upper bridge driver circuit 504, the second lower bridge driver circuit 505, and the PFC driver circuit 506 to be out of operation, thereby to control the first motor M1, the second motor M2, and the PFC switch transistor Q5 to be out of operation. Similarly, in the embodiment, on condition that the power input end (not shown) of the high voltage side in the driver IC circuit 500 is in the under-voltage state, the under-voltage protection circuit 510 of the high voltage side outputs the second under-voltage protection signal to the logic input buffer circuit 501, so as to control the first upper bridge driver circuit 502, the first lower bridge driver circuit 503, the second upper bridge driver circuit 504, the second lower bridge driver circuit 505, and the PFC driver circuit 506 to be out of operation. By this way, other modules can be prevented from continuing working when some error occurs, which protects the intelligent power module 600, thereby improving the reliability thereof.

As described above, the intelligent power module 600 in this embodiment adopts the highly integrated driver IC circuit 500, and the shared protection circuit 507, which simplifies the high integrated intelligent power module (also referred to as high integrated IPM), thereby to improve the integration and reliability of the intelligent power module, and also reduce the cost and the volume. In addition, the intelligent power module 600 in this embodiment also reduces the difficulty of internal wirings. In summary, the intelligent power module 600 in this embodiment has advantages of simple and reasonable structure, flexible operation, low cost, high integration, high reliability and improved applicability.

The present disclosure further provides an air conditioner. The air conditioner includes any of the intelligent power modules as described above, which is not detailed herein. It should be understood that since the air conditioner in this embodiment adopts all the technical solutions of the above intelligent power modules, thus can achieve all the technical effects introduced by the above intelligent power modules.

The foregoing description merely portrays some illustrative embodiments in accordance with the disclosure and therefore is not intended to limit the patentable scope of the disclosure. Any equivalent structure or flow transformations that are made taking advantage of the specification and accompanying drawings of the disclosure and any direct or indirect applications thereof in other related technical fields shall all fall in the scope of protection of the disclosure.

What is claimed is:

1. A driver IC circuit of an intelligent power module, comprising:
    an operating voltage input end, an inverter logic buffer circuit, an upper bridge driver circuit, a lower bridge driver circuit, a power factor correction (PFC) logic buffer circuit, a PFC driver circuit, a first voltage regulation control input end, a second voltage regulation control input end, a first voltage regulation module and a second voltage regulation module;
    wherein:
    the first voltage regulation control input end is configured to input a first voltage regulation control signal;
    the first voltage regulation module is configured to regulate a voltage input by the operating voltage input end according to the first voltage regulation control signal and to supply a first driving voltage to the inverter logic buffer circuit, the upper bridge driver circuit and the lower bridge driver circuit, wherein the voltage input is regulated to increase, decrease or maintain the same to generate the first driving voltage;
    the second voltage regulation control input end is configured to input a second voltage regulation control signal;
    the second voltage regulation module is configured to regulate the voltage input by the operating voltage input end according to the second voltage regulation control signal and to supply a second driving voltage to the PFC logic buffer circuit and the PFC driver circuit, wherein the voltage input is regulated to increase, decrease or maintain the same to generate the second driving voltage.

2. The driver IC circuit according to claim 1, wherein:
    an input end of the first voltage regulation module is connected to the operating voltage input end, a control end of the first voltage regulation module is connected to the first voltage regulation control input end, and an output end of the first voltage regulation module is respectively connected to driving voltage input ends of the inverter logic buffer circuit, the upper bridge driver circuit and the lower bridge driver circuit;
    an input end of the second voltage regulation module is connected to the operating voltage input end, a control end of the second voltage regulation module is connected to the second voltage regulation control input end, and an output end of the second voltage regulation module is respectively connected to driving voltage input ends of the PFC logic buffer circuit and the PFC driver circuit;

an output end of the inverter logic buffer circuit is respectively connected to an input end of the upper bridge driver circuit and an input end of the lower bridge driver circuit; and
an output end of the PFC logic buffer circuit is connected to an input end of the PFC driver circuit.

3. The driver IC circuit according to claim 1, wherein the first voltage regulation module comprises:
a first step-up module, a first step-down module, and a first analog switch;
wherein:
an input end of the first step-up module and an input end of the first step-down module are connected to the operating voltage input end,
an output end of the first step-up module is connected to a first input end of the first analog switch, an output end of the first step-down module is connected to a second input end of the first analog switch, and a third input end of the first analog switch is directly connected to the operating voltage input end,
a common end of the first analog switch is respectively connected to the driving voltage input ends of the inverter logic buffer circuit, the upper bridge driver circuit and the lower bridge driver circuit, and
a control end of the first analog switch is connected to the first voltage regulation control input end.

4. The driver IC circuit according to claim 1, wherein, the second voltage regulation module comprises:
a second step-up module, a second step-down module, and a second analog switch;
wherein:
an input end of the second step-up module and an input end of the second step-down module are connected to the operating voltage input end,
an output end of the second step-up module is connected to a first input end of the second analog switch, an output end of the second step-down module is connected to a second input end of the second analog switch, a third input end of the second analog switch is directly connected to the operating voltage input end,
a common end of the second analog switch is respectively connected to the driving voltage input ends of the PFC logic buffer circuit and the PFC driver circuit, and
a control end of the second analog switch is connected to the second voltage regulation control input end.

5. An intelligent power module comprising:
a power input end of a low voltage region, a first voltage regulation end, a second voltage regulation end, an upper bridge-arm control input end, a lower bridge-arm control input end, and a PFC control input end, a plurality of resistors, a first upper bridge-arm switch transistor, a second upper bridge-arm switch transistor, a third upper bridge-arm switch transistor, a first lower bridge-arm switch transistor, a second lower bridge-arm switch transistor, a third lower bridge-arm switch transistor, a PFC switch transistor, and the driver IC circuit according to claim 1;
wherein:
the power input end of the low voltage region is connected to the operating voltage input end of the driver IC circuit;
the first voltage regulation end is connected to the first voltage regulation control input end of the driver IC circuit, the second voltage regulation end is connected to the second voltage regulation control input end of the driver IC circuit;
the upper bridge-arm control input end is connected to the upper bridge control input end of the driver IC circuit, the lower bridge-arm control input end is connected to the lower bridge control input end of the driver IC circuit;
the PFC control input end is connected to a PFC control input end of the driver IC circuit;
a first output end of the upper bridge driver circuit is connected to a control end of the first upper bridge-arm switch transistor via one of the plurality of resistors, a second output end of the upper bridge driver circuit is connected to a control end of the second upper bridge-arm switch transistor via one of the plurality of resistors, and a third output end of the upper bridge driver circuit is connected to a control end of the third upper bridge-arm switch transistor via one of the plurality of resistors;
a first output end of the lower bridge driver circuit is connected to a control end of the first lower bridge-arm switch transistor via one of the plurality of resistors, a second output end of the lower bridge driver circuit is connected to a control end of the second lower bridge-arm switch transistor via one of the plurality of resistors, and a third output end of the lower bridge driver circuit is connected to a control end of the third lower bridge-arm switch transistor via one of the plurality of resistors; and
an output end of the PFC driver circuit is connected to a control end of the PFC switch transistor via one of the plurality of resistors.

6. An air conditioner, comprising the intelligent power module according to claim 5.

7. A driver IC circuit of an intelligent power module, comprising:
an operating voltage input end, an inverter logic buffer circuit, an upper bridge driver circuit, a lower bridge driver circuit, a PFC logic buffer circuit, a PFC driver circuit, a voltage regulation control input end, and a voltage regulation module; wherein:
the voltage regulation control input end is configured to input a voltage regulation control signal;
the voltage regulation module is configured to regulate a voltage input by the operating voltage input end according to the voltage regulation control signal input by the voltage regulation control input end and to supply a driving voltage to the inverter logic buffer circuit, the upper bridge driver circuit, the lower bridge driver circuit, the PFC logic buffer circuit, and the PFC driver circuit;
an input end of the voltage regulation module is connected to the operating voltage input end, a control end of the voltage regulation module is connected to the voltage regulation control input end, and an output end of the voltage regulation module is respectively connected to driving voltage input ends of the inverter logic buffer circuit, the upper bridge driver circuit, the lower bridge driver circuit, the PFC logic buffer circuit and the PFC driver circuit;
an output end of the inverter logic buffer circuit is respectively connected to an input end of the upper bridge driver circuit and an input end of the lower bridge driver circuit; and
an output end of PFC logic buffer circuit is connected to an input end of the PFC driver circuit.

8. The driver IC circuit according to claim 7, wherein:
the voltage regulation module comprises a step-down module and an analog switch, wherein:

an input end of the step-down module is connected to the operating voltage input end, an output end of the step-down module is connected to a first input end of the analog switch, a second input end of the analog switch is directly connected to the operating voltage input end, a common end of the analog switch is respectively connected to the driving voltage input ends of the inverter logic buffer circuit, the upper bridge driver circuit, the lower bridge driver circuit, the PFC logic buffer circuit, and the PFC driver circuit, and a control end of the analog switch being connected to the voltage regulation control input end; or the voltage regulation module comprises a step-up module and an analog switch, wherein:

an input end of the step-up module is connected to the operating voltage input end, an output end of the step-up module is connected to a first input end of the analog switch, a second input end of the analog switch is directly connected to the operating voltage input end, a common end of the analog switch is respectively connected to the driving voltage input ends of the inverter logic buffer circuit, the upper bridge driver circuit, the lower bridge driver circuit, the PFC logic buffer circuit, and the PFC driver circuit, and a control end of the analog switch is connected to the voltage regulation control input end.

9. An intelligent power module comprising:

a power input end of a low voltage region, a voltage regulation end, an upper bridge-arm control input end, a lower bridge-arm control input end, a PFC control input end, a plurality of resistors, a first upper bridge-arm switch transistor, a second upper bridge-arm switch transistor, a third upper bridge-arm switch transistor, a first lower bridge-arm switch transistor, a second lower bridge-arm switch transistor, a third lower bridge-arm switch transistor, a PFC switch transistor, and the driver IC circuit according to claim 5; wherein, the power input end of the low voltage region is connected to the operating voltage input end of the driver IC circuit;

the voltage regulation end is connected to the voltage regulation control input end of the driver IC circuit;

the upper bridge-arm control input end is connected to an upper bridge control input end of the driver IC circuit, the lower bridge-arm control input end is connected to a lower bridge control input end of the driver IC circuit;

the PFC control input end is connected to a PFC control input end of the driver IC circuit;

a first output end of the upper bridge driver circuit is connected to a control end of the first upper bridge-arm switch transistor via one of the plurality of resistors, a second output end of the upper bridge driver circuit is connected to a control end of the second upper bridge-arm switch transistor via one of the plurality of resistors, and a third output end of the upper bridge driver circuit is connected to a control end of the third upper bridge-arm switch transistor via one of the plurality of resistors;

a first output end of the lower bridge driver circuit is connected to a control end of the first lower bridge-arm switch transistor via one of the plurality of resistors, a second output end of the lower bridge driver circuit is connected to a control end of the second lower bridge-arm switch transistor via one of the plurality of resistors, and a third output end of the lower bridge driver circuit is connected to a control end of the third lower bridge-arm switch transistor via one of the plurality of resistors; and an output end of the PFC driver circuit is connected to a control end of the PFC switch transistor via one of the plurality of resistors.

10. An air conditioner, comprising the intelligent power module according to claim 9.

* * * * *